US006296773B1

(12) United States Patent
McMullen et al.

(10) Patent No.: US 6,296,773 B1
(45) Date of Patent: Oct. 2, 2001

(54) REMOVAL OF BORON AND FLUORIDE FROM WATER

(75) Inventors: Jacques McMullen, Toronto (CA); Wilson Tsu, Elko, NV (US); Reinhard Kargel, Toronto (CA)

(73) Assignee: Barrick Gold Corporation, Ontario (CA)

(*) Notice: Subject to any disclaimer, the term of this patent is extended or adjusted under 35 U.S.C. 154(b) by 0 days.

(21) Appl. No.: 09/498,875

(22) Filed: Feb. 7, 2000

Related U.S. Application Data

(62) Division of application No. 09/049,331, filed on Mar. 17, 1998, now Pat. No. 6,039,789.

(51) Int. Cl.$^7$ .................................................. C02F 1/58
(52) U.S. Cl. .................... 210/713; 210/714; 210/724; 210/726; 210/737; 210/911; 210/915; 423/286; 423/490
(58) Field of Search .................................. 210/713, 714, 210/724, 725, 726, 727, 737, 902, 911, 915; 423/286, 490, 497

(56) References Cited

U.S. PATENT DOCUMENTS

| | | | |
|---|---|---|---|
| 2,428,418 | * 10/1947 | Goetz et al. ........................ | 210/713 |
| 4,008,162 | * 2/1977 | Korenowski et al. ............... | 210/737 |
| 4,035,469 | 7/1977 | Richmond et al. ................... | 423/164 |
| 4,201,758 | 5/1980 | Allain et al. ......................... | 423/497 |
| 4,224,148 | * 9/1980 | Lindman et al. ..................... | 210/714 |
| 4,311,679 | 1/1982 | Queneau et al. ....................... | 423/55 |
| 4,384,889 | 5/1983 | Wiewiorowski et al. ............. | 75/101 |
| 4,402,835 | * 9/1983 | Mattera et al. ...................... | 210/724 |

(List continued on next page.)

FOREIGN PATENT DOCUMENTS

| | | | |
|---|---|---|---|
| 53/46163 | 4/1978 | (JP) | C02C/5/02 |
| 57/071692 | 5/1982 | (JP) | C02F/1/58 |
| 59/166290 | 9/1984 | (JP) | C02F/1/58 |
| 1560484 | 4/1990 | (UA) | C02F/1/52 |

OTHER PUBLICATIONS

Okay, et al., Boron Pollution in the Simav River, Turkey and Various Methods of Boron Removal; Water Res. vol. 19, No. 7, pp. 857–862, 1985.

(List continued on next page.)

*Primary Examiner*—Peter A. Hruskoci
(74) *Attorney, Agent, or Firm*—Senniger, Powers, Leavitt & Roedel

(57) ABSTRACT

A process for reducing boron and/or fluoride ion content of water. Feed water is contacted, in the presence of magnesium, with an alkaline hydroxide to produce treated water and a magnesium precipitate containing boron and fluorine. The precipitate is separated from the treated water. The boron content of water is reducible from above about 0.8 mg/L to below about 0.7 mg/L, and the fluoride ion content is reducible from above about 1 mg/L to below about 0.9 mg/L. The magnesium precipitate is optionally used to neutralize pressure oxidized ore slurry or roaster calcine in the context of gold recovery operations.

26 Claims, 11 Drawing Sheets

U.S. PATENT DOCUMENTS

| | | | |
|---|---|---|---|
| 4,497,781 | | 2/1985 | Spoors et al. ......................... 423/164 |
| 4,571,263 | | 2/1986 | Weir et al. ............................. 75/101 |
| 4,619,814 | | 10/1986 | Salter et al. ........................... 423/27 |
| 5,071,477 | | 12/1991 | Thomas et al. ........................ 75/744 |
| 5,401,296 | | 3/1995 | Martenson et al. .................... 75/741 |
| 5,403,495 | * | 4/1995 | Kust et al. ............................ 210/710 |
| 5,489,326 | | 2/1996 | Thomas et al. ........................ 75/744 |
| 5,536,297 | | 7/1996 | Marchbank et al. ................... 75/744 |
| 5,855,793 | * | 1/1999 | Ikeda et al. .......................... 210/711 |
| 6,039,789 | * | 3/2000 | McMullen et al. .................... 75/711 |

OTHER PUBLICATIONS

Wong, Boron Control in Power Plant Reclaimed Water for Potable Reuse; Environment Progress, vol. 3, No. 1, pp 5–11, Feb. 1984.

Kawamura, Integrated Design of Water Treatment Facilities, Wiley & Sons (1991).

Idelovitch et al, Magnesium Recycling by Carbonation and Centrifugation of High–lime Wastewater Sludge, Journal WPCF, vol. 55, No. 2, pp. 136–144 (XP–002092114).

Turek, The Influence of Magnesium Hydroxide Precipitation Conditions on the Boron Content, Polish Journal of Applied Chemistry, 1995, pp. 211–213 (XP–002092123).

* cited by examiner

SPHERULITIC CONFORMATION OF $CaCO_3$
CALCITE ARAGONITE $3MgO \cdot 6SiO_2 \cdot Mg(OH)_2 \cdot 6H_2O$
F B "SEPIOLITE"
$5Mg(OH)_2$
$+$
$BO_3\ BO_2$
$+$
F (FLUORINE)

US 6,296,773 B1

REMOVAL OF BORON AND FLUORIDE FROM WATER

This application is a divisional application of Ser. No. 09/,049,331 filed on Mar. 27, 1998 now U.S. Pat. No. 6,039,789.

BACKGROUND OF THE INVENTION

This invention relates to a process for removing boron and fluoride ions from water generated in mine dewatering operations so the ultimate boron and fluoride levels meet stringent governmental environmental requirements for discharge of such water into surface streams.

As a particular example, water resulting from dewatering operations at gold mines in the Carlin trend area of Nevada, U.S.A. can contain dissolved boron concentrations on the order of about 1 mg/L, which due to environmental regulations must be reduced to about 0.6 mg/L or less before such water can be dispensed into the Humboldt River. Such water may also contain dissolved fluoride ion concentrations on the order of about 1.5 mg/L, which must be reduced to about 0.8 mg/L or less.

Prior attempts to remove boron from water by conventional water treatment methods such as treatment with aluminum sulfate, ferric salts, and lime have proved to be ineffective. Evaporation-crystallization processes and solvent extraction processes have been investigated. Ion exchange processes employing strong base ion exchange resins have been demonstrated to be effective, but remove other ionic species as well. As such, they are inefficient if boron is the only element to be removed. One resin, the ion specific resin for boron developed by Rohm & Haas Co., is also uneconomic for treatment of large volumes of water containing a low B concentration.

Mine dewatering operations are found in conjunction with, for example, gold recovery operations in the Carlin trend area of Nevada, U.S.A. Processes for the recovery of gold from refractory sulfide ores, "double refractory" ores containing sulfide and carbonaceous material, and other difficult ores such as those ores located in the Carlin trend employ pressure oxidation under acidic conditions as disclosed, for example, in Thomas et al. U.S. Pat. No. 5,071,477 and Thomas et al. U.S. Pat. No. 5,489,326 and/or, alternatively, a roasting operation. The products of such oxidation processes typically contain high acidic contents which must be neutralized before further processing by cyanidation as disclosed in the Thomas et al. patents, or by thiosulfate leaching in the manner disclosed in Marchbank et al. U.S. Pat. No. 5,536,297. There is a need, therefore, for an abundant source of neutralizing agent which is compatible with the gold recovery process in that it does not contain contaminants or other agents which substantially interfere with gold recovery, and which does not add substantially to the raw material requirements and disposal requirements for the overall operation.

SUMMARY OF THE INVENTION

Among the several objects of the invention, therefore, is to provide a water treatment process for reducing the boron content of water having a relatively low boron content down to a level of about 0.6 mg/L or less. Another object is to provide a process for reducing the fluoride ion content of water having a relatively low fluoride ion content down to a level of about 0.8 mg/L or less. Depending on site-specific requirements, another object is to utilize an alkaline sludge produced in the water treatment process for partially neutralizing acidic gold ore slurry from autoclaves or roasters in the context of gold recovery operations, otherwise the sludge would have to be disposed per applicable regulations.

Briefly, therefore, the invention is directed to a process for reducing boron and/or fluoride ion content of feed water containing boron. The pH of the feed water is adjusted in the presence of a source of magnesium in a concentration of between about 10 and about 80 mg magnesium per liter of feed water, to produce treated water and a magnesium precipitate containing boron and/or fluorine. The precipitate is separated from the treated water such that the treated water contains less than about 2 mg/L boron and/or less than about 0.9 mg/L fluoride ions. The magnesium is from a source selected from magnesium present in the feed water, magnesium added to the feed water in the form of a magnesium salt, and combinations thereof.

The invention is also directed to a process for reducing boron and/or fluoride ion content of water by contacting a quantity of feed water containing boron in the presence of magnesium and silicon with an alkaline hydroxide to produce treated water and a magnesium precipitate comprising an alkaline magnesium silicate containing boron and/or fluorine and separating the precipitate from the treated water such that the treated water has a reduced boron and/or fluoride ion content.

In another aspect, the invention is directed to a process for reducing boron and/or fluoride ion content of water, the process comprising adjusting, in the presence of magnesium, the pH of a quantity of feed water containing boron and/or fluoride ion at a temperature in the range of about 85° F. to about 130° F., to between about 10.2 and about 10.6 to produce treated water and a magnesium precipitate containing boron and/or fluorine, and separating the precipitate from the treated water to produce water having a reduced boron and/or fluoride ion content.

The invention is further directed to a process for reducing boron and/or fluoride ion content of water by adjusting the pH of a quantity of feed water containing boron in the presence of magnesium by contacting the water with an alkaline hydroxide in a contacting zone to produce treated water and a magnesium precipitate containing boron and/or fluorine, separating the treated water and precipitate into a substantially liquid fraction comprising treated water having a reduced boron and/or fluoride ion content and a substantially solid fraction comprising the precipitate, and transferring a portion of the solid fraction to the contacting zone to facilitate nucleation of said magnesium precipitate.

In another aspect, the invention is directed to an integrated process for reducing boron and/or fluoride ion content of water, and recovering gold from a refractory auriferous ore containing sulfide sulfur. The process includes contacting a quantity of feed water containing boron and/or fluoride ion in the presence of magnesium with an alkaline hydroxide to produce treated water and a magnesium precipitate containing boron and/or fluorine, and separating the treated water and precipitate into a substantially liquid fraction comprising water having a reduced boron and/or fluoride ion content and a substantially solid fraction comprising the precipitate. An aqueous slurry is formed of the refractory auriferous ore and subjected to pressure oxidation in an autoclave to produce an oxidized ore slurry, the pH of the oxidized slurry is raised by contacting the slurry with the substantially solid fraction containing the magnesium precipitate, and gold is recovered from the slurry.

The invention is further directed to an integrated process for reducing boron and/or fluoride ion content of water, and recovering gold from a refractory auriferous ore containing sulfide sulfur. A quantity of feed water containing boron and/or fluoride ion is contacted with an alkaline hydroxide in the presence of magnesium to produce treated water and a magnesium precipitate containing boron and/or fluorine. The treated water and precipitate are separated into a substantially liquid fraction comprising water having a reduced boron and/or fluoride ion content and a substantially solid fraction comprising the precipitate. A refractory ore is subjected to roasting in a roaster to produce a roaster calcine. An aqueous slurry is formed from the roaster icalcine, and the pH of the calcine is raised by contacting the calcine with the substantially solid fraction containing the magnesium precipitate, and gold is recovered from the calcine.

The invention is also directed to an integrated process for reducing boron and fluoride ion content of water, and recovering gold from a refractory auriferous ore containing sulfide sulfur. In the process a quantity of feed water containing greater than 0.8 mg/L boron and greater than 1 mg/L fluoride ion at a temperature in the range of about 85° F. to about 130° F. is contacted in a contacting zone with magnesium in a dosage of between about 10 and about 80 mg magnesium per liter of feed water in the form of a magnesium sulfate in solution.

The feed water is contacted with a first lime slurry to produce treated water and a magnesium precipitate containing $3MgO \cdot 6SiO_2 \cdot Mg(OH)_2 \cdot 6H_2O$, $Mg(OH)_2$, B, and F. The treated water and precipitate are separated into a substantially liquid fraction comprising water having a boron content below 0.7 mg/L and fluoride ion content below 0.9 mg/L and a substantially solid fraction the precipitate. A portion of the solid fraction is transferred to the contacting zone to facilitate nucleation of the magnesium precipitate. An aqueous ore slurry is formed from the refractory auriferous ore, and subjected to pressure oxidation in an autoclave to produce an oxidized ore slurry. The pH of the oxidized slurry is raised to between about 3 and about 4 by contacting the slurry with the substantially solid fraction containing the magnesium precipitate. The pH of the oxidized slurry is raised further to between about 10 and about 10.5 by contacting the slurry with a second lime slurry, and gold is recovered from the slurry.

Other objects and features of the invention will be in part apparent and in part pointed out hereinafter.

DETAILED DESCRIPTION OF THE INVENTION

Figure 1:
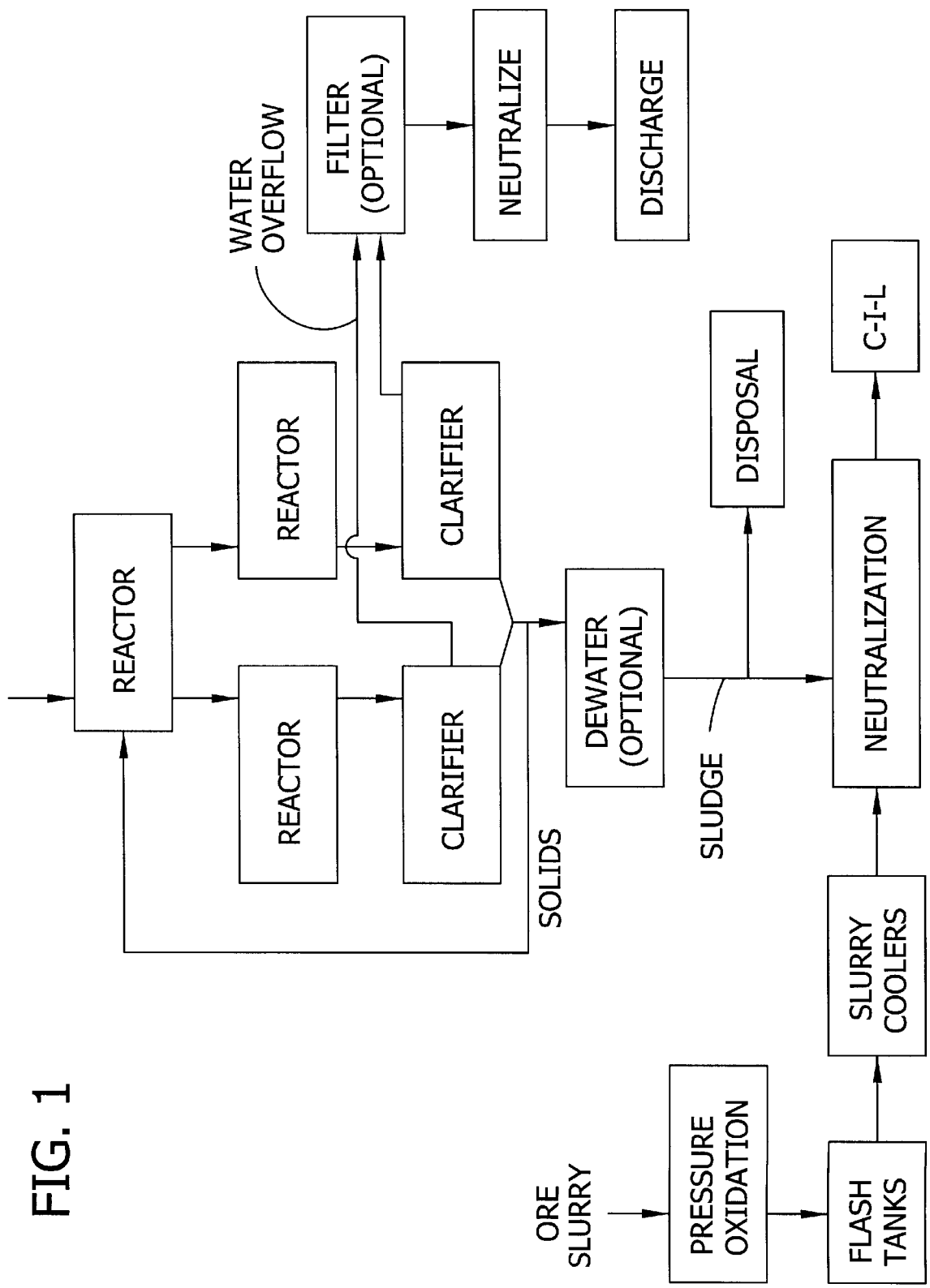
FIG. 1 is a flowsheet describing the principal operations in accordance with the process of the invention.

In accordance with the process of the invention, magnesium salt (e.g., $MgSO_4$) in solution and calcium hydroxide $Ca(OH)_2$ slurry are successively added to water to be treated under conditions of pH and temperature effective to precipitate magnesium compounds. Boron and fluoride ions are removed by co-precipitation, adsorption and/or enmeshment with what appears to be an alkaline magnesium silicate with a quantity of $Mg(OH)_2$. In one preferred embodiment, the boron content is reduced from above about 0.8 mg/L to below about 0.7 mg/L, and the fluoride ion content is reduced from above about 1 mg/L to below about 0.9 mg/L. In a still further preferred embodiment, the boron and fluoride ion contents are reduced to less than 75% of their original level. To dispose of the precipitate, precipitated solids are separated from the water by gravity settling in a clarifier. A certain amount of solids is recycled to the reaction tank to initiate and accelerate the precipitation reactions, and to improve settling characteristics in the clarifier. The amount of solids to be discarded is further processed for disposal or use in other unit operations. The liquid overflow from the clarifier is optionally filtered to further reduce its solids content, and neutralized with acid to meet environmental effluent pH guidelines.

In one preferred embodiment of the invention, water having the characteristics stated in Table 1 is treated to provide water having the characteristics stated in Table 2.

TABLE 1

|  | Range | Average |
| --- | --- | --- |
| Boron mg/L | 0.73–1.00 | 0.84 |
| Fluoride mg/L | 1.18–1.78 | 1.35 |
| Magnesium mg/L | 20.2–23.8 | 22.3 |
| Silica mg/L | 19.6–21.5 | 20.9 |
| TDS mg/L | 356–659 | 520 |
| pH | 7.07–8.52 | 8.35 |
| Temperature, ° F. | 86–132 | 100 |
| Alkalinity Total as $CaCO_3$ mg/L | 321–421 | 371 |
| Hardness Total as $CaCO_3$ mg/L | 214–396 | 272 |

TABLE 2

| Boron mg/L | 0.61 max. |
| --- | --- |
| Fluoride mg/L | 0.87 max. |
| TDS mg/L | 358 max |
| pH | 7.5–8.3 |
| Temperature | within 2° C. ambient river temp. |

Magnesium salt in solution is added to the feed water before entering the reactor. The preferred salt is the sulfate salt in anhydrous form ($MgSO_4$) or hydrated form ($MgSO_4 \cdot 7H_2O$). Other suitable sources of Mg include, but are not limited to, $MgCl_2$, $MgCl_2 \cdot 6H_2O$, and $Mg(HCO_3)_2$.

It is preferred that the Mg salt be added in its dissolved state, to facilitate rapid and uniform distribution of the salt in the water. The amount of magnesium (Mg) salt added depends on the concentration of Mg present in the feed water, the concentration of boron and fluoride in the feed water, the amount of boron and fluoride to be removed, the treatment pH, and the amount of silica in the feed water. For a typical feed water having the analysis shown in Table 3, between about 10 and about 80 mg/L Mg, preferably about 20 mg/L Mg, is added in accordance with this invention.

TABLE 3

| | |
|---|---|
| Boron | 0.85 mg/L |
| Fluoride | 1.4 mg/L |
| Magnesium | 20 mg/L |
| Silica | 39 mg/L |
| TDS | 425–600 mg/L |
| pH | 6.7–8.2 |
| Temperature | 38–55° C. |
| Target boron | 0.6 mg/L |
| Target fluoride | 0.8 mg/L |
| Target TDS | 358 mg/L |

The concentration of Mg to be added is determined by jar tests. The amount of $MgSO_4$ added is sufficiently low that the $SO_4$ ions remain in solution and no $CaSO_4$ (Ca being added as a source of hydroxide, as described below) precipitates. Further, the amount of $SO_4$ added is selected so as not to adversely affect the total dissolved solids content of the water, a significant consideration in view of environmental requirements for discharge into surface streams.

A source of hydroxide to raise the pH and facilitate the precipitation of magnesium compounds is added to the stirred tank reactor. The preferred source is $Ca(OH)_2$ produced by hydrating lime according to the following reaction:

$$CaO + H_2O \rightarrow Ca(OH)_2$$

Other sources include commercially available hydrated lime [Ca $(OH)_2$], alkaline earth metal hydroxides, as well as dolomitic lime. The amount of $Ca(OH)_2$ added is determined by titration to achieve the desired treatment pH. The amount of $Ca(OH)_2$ added is not determined by a stoichiometric relationship with $MgSO_4$, as simple stoichiometric addition of $Ca(OH)_2$ does not guarantee enough $(OH)^-$ ion concentration to cause $Mg(OH)_2$ to precipitate. In one preferred embodiment where the total dissolved solids of the feed water is 520 mg/L, 420 mg/L $Ca(OH)_2$ is preferred in order to achieve the desired treatment pH of 10.4 to 10.6. The hydrated lime is added in slurry form to precipitate calcium carbonate and magnesium hydroxide according to the following reactions:

$$CO_2 + Ca(OH)_2 \rightarrow CaCO_3\downarrow + H_2O$$

$$Ca(HCO_3)_2 + Ca(OH)_2 \rightarrow 2CaCO_3\downarrow + 2H_2O$$

$$Mg(HCO_3)_2 + Ca(OH)_2 \rightarrow CaCO_3\downarrow + MgCO_3 + 2H_2O$$

$$MgCO_3 + Ca(OH)_2 \rightarrow CaCO_3\downarrow + Mg(OH)_2\downarrow$$

Calcium sulfate ($CaSO_4$) will not precipitate since prevailing concentrations will normally be well below its solubility limit (2980 mg/L at 20° C. in pure water). This is acceptable since precipitation of $CaSO_4$ is not a requirement for the reduction of the levels of boron and fluoride.

It is believed that the order of addition, namely, $MgSO_4$ before $Ca(OH)_2$ is important, and that simply adding $Mg(OH)_2$ to the feed water without precipitation reaction thereof in the reactor will not achieve the desired results.

The pH selected is not, in itself, of narrowly critical. The objective is to operate at a pH level that will result in the maximum amount of $Mg(OH)_2$ precipitation, consistent with the constraints of other parameters that may be imposed upon the system, since the co-precipitation of $Mg(OH)_2$ along with silicon is the driving force for the reduction in the levels of boron and fluoride. The treatment pH is selected in order to remove maximum amounts of magnesium and silica, which results in the removal of maximum amounts of boron and fluoride, while remaining at level to ensure the TDS (total dissolved solids) in the final effluent are within regulatory guidelines. The preferred pH for treating waters generated by dewatering operations in the Carlin trend is in the range of about 10.4 to about 10.6. A pH significantly below about 10.2 is avoided because insufficient $Mg(OH)_2$ may precipitate which would affect the efficiency of removal of boron and fluoride. A pH significantly above about 10.8 is avoided because at high pH there is a tendency for increase in level of TDS due to excess alkalinity [$Ca(OH)_2$]. Furthermore, at too high a pH there is a tendency for boron and fluoride to re-dissolve in the sludge phase.

The temperature of the feedwater can affect the process parameters, because at a higher temperature $Mg(OH)_2$ tends to precipitate at a lower pH. For the typical feed water of the invention, the water temperature is in the range of about 38° C. to 55° C. At lower temperatures, for example, 10° C. to 20° C., a pH of about 11 or greater is required to precipitate magnesium compounds. As such, it is important to take temperature into account when selecting specific parameters.

In selecting specific parameters a balance is struck among pH, temperature and magnesium dosage. In particular, the parameters selected take into account that a higher pH facilitates complete magnesium compound precipitation and therefore reduces magnesium requirements, while also producing, disadvantageously, a higher TDS potentially above environmental guidelines. At a lower pH higher magnesium concentration is required to achieve equivalent B and F removal. Furthermore, generally, higher temperatures require a lower pH than lower temperatures.

It has been discovered in connection with this invention that it is critical to substantially reduce, via a co-precipitation mechanism, the silicon concentration of water treated by this method in order to achieve boron and fluoride removal to the levels desirable. (Although silicon and other elements such as magnesium and boron are referred to herein in their elemental form, it should be understood such elements may be in a combined form, e.g., silicates, in water treated by this invention.) In particular, while a typical water treated by this method has, for example, about 19–22 mg/L Si, it is noted that adequate reductions in B level are achieved only if silicon levels are also reduced. Without being bound to a particular theory, it is believed that a relatively stable spherulitic crystalline matter, in particular an alkaline magnesium silicate, more particularly $3MgO \cdot 6SiO_2 \cdot Mg(OH)_2 \cdot 6H_2O \cdot 6H_2O$ (sepiolite), is precipitated, with co-precipitation of $Mg(OH)_2$. Boron and fluoride are removed by the precipitation products, although it has not been conclusively determined whether the mechanism is co-precipitation, adsorption, or enmeshment.

Turning to FIG. 1, in the preferred operation of the process of the invention, $MgSO_4$ at a dose of about 20 mg magnesium per liter of water to be treated is injected into water to be treated before the water enters a stirred tank reactor. The water is then fed into a stirred tank reactor for contacting with lime addition by mechanical agitation. The flow through the tank is controlled to result in a retention time of about 8 minutes in the reactor. Clarifier underflow solids are recycled and fed into the tank reactor. This recycle has been discovered to advantageously serve as seed material for initiation of the precipitation reactions. This recycle also results in precipitates with larger and denser particles which have faster settling rates and produce a denser sludge. It is preferred that the recycle be controlled to maintain about 2% to about 8% solids by volume. In one particularly preferred embodiment, solids in the first tank are controlled in this manner to be about 2.2% by weight. At laboratory scale, it is possible to operate the process without this recycle, so this recycle is not necessary to the process's ability to remove boron and fluoride. However, for full scale operation this recycle is important to obtaining enhanced reaction kinetics and improvement in the settling and concentrating characteristics of the precipitated solids.

Water with precipitating solids flows out of the first tank reactor into a second reactor stage consisting of two mechanically agitated tanks arranged for parallel flow, wherein the precipitation reactions proceed to completion. The use of two reactors is optional. The residence time in these tanks is preferably about 16 minutes. The number of tanks used may vary based on hydraulic considerations.

Water and solids leaving the second reactor stage proceed to a clarifying stage consisting of two clarifiers, arranged for parallel flow, with a design overflow rate of 1.0 gpm/sq. ft. The use of two clarifiers is optional. The number of clarifiers may vary depending upon hydraulic and other process engineering considerations. The clarifiers are optionally equipped with peripheral and, in case of large diameter units, radial discharge launders, mechanical sludge rakes and sludge underflow pumps for recirculation and disposal of precipitated solids.

Solids from the clarifier underflow are recirculated at a maximum rate of about 8% of the volume of the feed water. Higher recirculation percentages are not believed to be detrimental to the process. An amount of underflow solids equal to the amount generated daily is directed to a sludge storage tank for subsequent re-use in the gold plant recovery circuit.

In an optional operation when the water is to be discharged into a river, and the discharge temperature is regulated, water from the clarifier overflow is directed to cooling towers for cooling to within 2° C. of the ambient water temperature of the river into which it is to be discharged.

As a result of the foregoing treatment, boron concentrations are reduced to below, for example, 2 mg/L boron. In one embodiment, boron is reduced from between about 0.8 mg/L and about 5 mg/L to less than about 0.7 mg/L, for example, from above about 1 mg/L to below about 0.6 mg/L or, for example, from above about 0.7 to below about 0.6 mg/L. At such low levels of boron concentration, final boron levels to be achieved in the effluent are an order of magnitude lower than stated to be achieved by prior chemical precipitation methods referring to reduction from, for example, 10 mg/L to 5 mg/L. Similarly, fluoride ion concentration is reduced from at least about 1.3 mg/L fluoride ions to less than about 0.9 mg/L fluoride ions. As such, the process is effective for boron and fluoride ion removal in much more difficult conditions and ranges than that achieved by prior processes. The process also has proven efficacy for B and F removal in a large scale operation involving the treatment of groundwater high in TDS and containing nominal amounts of B and F of unknown speciation, and further containing other naturally occurring species such as iron, arsenic, chlorides, copper, manganese, zinc and others. Laboratory test work was performed using actual groundwater and did not require spiking of deionized water with known species of B and F.

In one preferred embodiment, sludge from the sludge storage tank is directed to neutralization of pressure oxidized ore slurry prepared in accordance with the processes disclosed in Thomas et al. U.S. Pat. No. 5,071,477, Thomas et al. U.S. Pat. No. 5,489,326, or Marchbank et al. U.S. Pat. No. 5,536,297, the entire disclosures of which are expressly incorporated herein by reference. To describe the use of the alkaline sludge in more detail, it is useful to briefly describe major features of the relevant portion of the autoclave circuit. Oxidized slurry leaving the autoclave is passed to a series of flash tanks where steam is flashed off to cool the slurry. Steam from each flash tank is recycled and contacted with autoclave feed slurry in a complementary splash condenser, operated at substantially the same pressure as the flash tank, for preheating the feed slurry to the autoclave. Typically, between 1 and 3 flash tanks and between 0 and 3 condensers are employed. Steam leaving each of flash tanks is optionally passed through cyclones for recovery of entrained solids. The recovered solids are blended back into the oxidized slurry. Oxidized slurry from the autoclave flash tanks has a solids content of at least about 30% by weight, preferably at least about 35% by weight, and contains soluble sulfates, iron salts, and arsenates. The slurry is transferred to an intermediate agitated storage tank.

In order to condition the slurry for gold recovery operations, the temperature of the hot oxidized slurry is reduced to between about 90° F. and about 140° F., preferably between about 100° F. and about 120° F., by passing the slurry through a series of shell and tube coolers. The temperature of the slurry is reduced by exchanging heat from the slurry to a cooling water stream. Cooling water is obtained from a recirculating system in which the water is recycled through a crossflow, induced draft cooling tower. Cooled oxidized slurry which discharged from the coolers is fed continuously through a series of agitated neutralization tanks. In accordance with the process described in Thomas et al. U.S. Pat. No. 5,071,477 and Thomas et al. U.S. Pat. No. 5,489,326, the cooled oxidized slurry is preferably directly neutralized without either washing the slurry or separating solids therefrom prior to neutralization. By omitting any washing operation between the autoclave and the neutralization operation, as is preferred but not required, the volume of materials handled is reduced and the need for other ancillary operations such as wash water recovery is avoided.

In the neutralization process the pressure oxidized gold slurry from the autoclave circuit is neutralized with a base, normally a slurry of calcium hydroxide is used, to raise its pH to between about 9 and about 11.5, preferably between about 10 and about 11, preferably about 10 or 10.5, according to the process described in Thomas et al. U.S. Pat. No. 5,071,477 and Thomas et al. U.S. Pat. No. 5,489,326, and to a pH of about 7 to 8.7 according to the Marchbank et al. U.S. Pat. No. 5,536,297.

In accordance with the present process for B and F removal, the alkaline sludge from the water treatment process, with a solids concentration of about 20 to 40% by weight, is metered into the first of three in series neutralization tanks. The sludge consists of a substantial water fraction, and a solids fraction consisting of about 94% by weight $CaCO_3$ and 6% magnesium compounds. The boron and fluoride content of the sludge, which is on the order of about 0.5 g B per kg of sludge and about 0.8 g F per kg of sludge, with a standard deviation of about (+/−)0.1 g/kg for B and F, has proven to be stable. The carbonate/hydroxide sludge partially neutralizes the sulfuric acid contained in the oxidized gold slurry from the autoclaves and raises the pH of the slurry from about 1.0 to a range of 3.0 to 4.0. The reaction products are calcium sulfate, magnesium sulfate and carbonic acid which decomposes to form carbon dioxide and water. The carbon dioxide formed is released to the atmosphere. This step is important to prevent the formation of calcium carbonate with the addition of lime in the second stage of neutralization. In the second set of neutralization reactors, the pH of the partially neutralized gold slurry is then raised with the addition of a lime slurry to the desired pH of about 10 to 10.5 for, for example, the process described in Thomas et al. U.S. Pat. No. 5,071,477, and to a pH of about 7.0 to 8.7 for, for example, the process described in Marchbank et al. U.S. Pat. No. 5,536,297. The third and final set of neutralization reactors serve as a backup to the preceding tanks. Additional lime slurry is added to the third neutralization tank, as necessary, to achieve the preferred pH range. The following overall reaction equations describe the process:

$$CaCO_3 \cdot MgCO_3 + H_2SO_4 \rightarrow CaSO_4 + MgSO_4 + 2H_2CO_3 \quad (1)$$

$$H_2CO_3 \rightarrow CO_2 + H_2O \quad (2)$$

$$Mg(OH)_2 + H_2SO_4 \rightarrow MgSO_4 + 2H_2O \quad (3)$$

$$Ca(OH)_2 + H_2SO_4 \rightarrow CaSO_4 + 2H_2O \quad (4)$$

$$CO_2 + Ca(OH)_2 \rightarrow CaCO_3 + H_2O \quad (5)$$

Compressed oxygen (or air) is optionally sparged into the oxidized gold slurry in the neutralization tanks to convert ferrous iron to ferric iron, as the former consumes cyanide in any subsequent cyanidation process. The neutralized gold-bearing slurry, having a solids content of 30 to 40% by weight and a temperature of about 25 to 35° C., is then pumped at a controlled rate to the gold recovery operation.

The gold may be recovered from the oxidized slurry by any of a number of means presently known or hereafter developed. In one preferred embodiment, the gold in the oxidized slurry is recovered by a conventional carbon-in-leach (C-I-L) cyanidation or cyanidation followed by carbon-in-pulp (C-I-P) in which the neutralized slurry is passed to a series of agitated carbon-in-leach tanks countercurrently to a flow of granular activated carbon. Loaded carbon recovered from the carbon-in-leach operation is stripped with hot alkaline cyanide solution and gold is recovered from the stripping solution by conventional means such as electrowinning and refining.

The following examples illustrate aspects of the current invention.

EXAMPLE 1

Raw well water from Barrick Gold Corporation's Meikle Mine (See Table 1 for analysis) was treated in accordance with the method of the invention, with treatment goal target limits of 0.61 mg/L for boron and 0.87 mg/L for fluoride. Water (750 ml) was placed into each of eight one-liter jars (J3-1 through J3-8), which were in turn placed in a water bath at 100° F. (38° C.) and mixed using a paddle stirrer at 30 rpm. Magnesium (20 mg/L) as a solution of magnesium sulfate (20 g/L $MgSO_4$ was added to the first four jars (J3-1 through J3-4), and magnesium (80 mg/L) as a solution of magnesium sulfate (20 g/L $MgSO_4$) was added to the second four jars (J3-5 through J3-8). Sufficient lime as a 25 g/L $Ca(OH)_2$ slurry was added to each jar to raise the pH to the selected target pH values. After reaching the desired pH, mixing of each jar was continued for 30 minutes. The contents of each jar were filtered using 0.45 micron filter paper. A 250 ml fraction of the filtrate of each water sample (for each jar) was analyzed for several analytes before neutralization. A second 250 mL fraction of each water sample was then neutralized by titration with concentrated sulfuric acid, and the conductivity, total dissolved solids (TDS), and other analytes were determined. Each filter/residue sample was weighed. The boron content of several residue samples was determined by ICPAES (inductively coupled plasma atomic emission spectroscopy), after dissolving in concentrated nitric acid. The fluoride content of several residue samples was determined by the ion specific electrode method, after dissolving in concentrated nitric acid.

Figure 2:
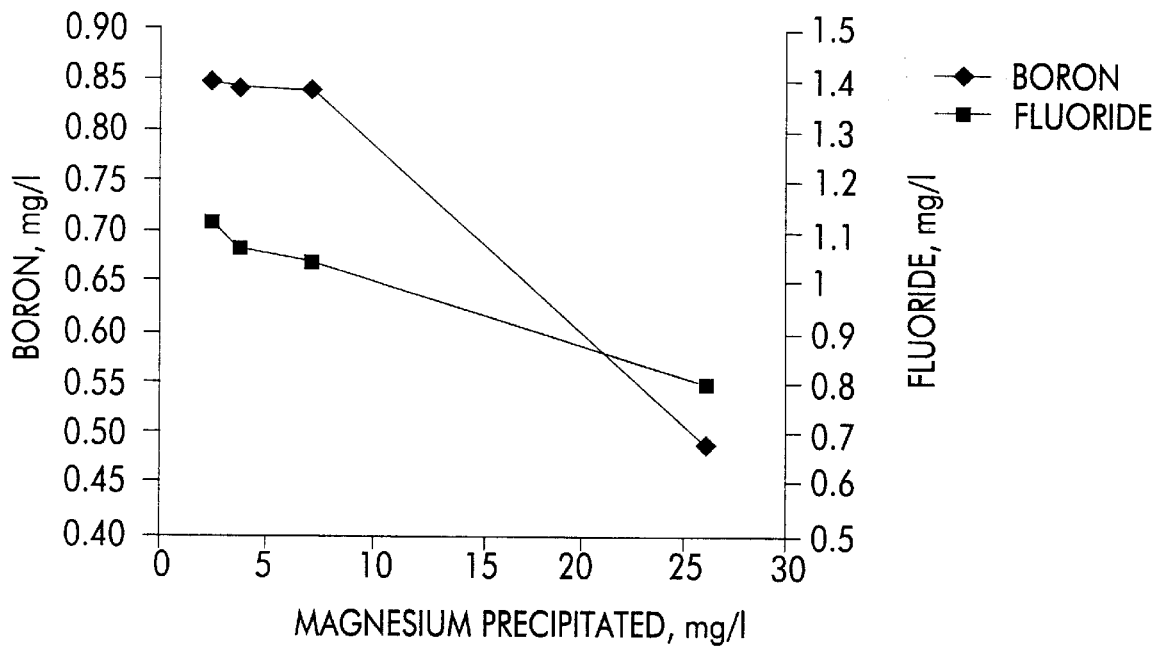
FIGS. 2 to 12 present data generated by the working examples.
Figure 3:
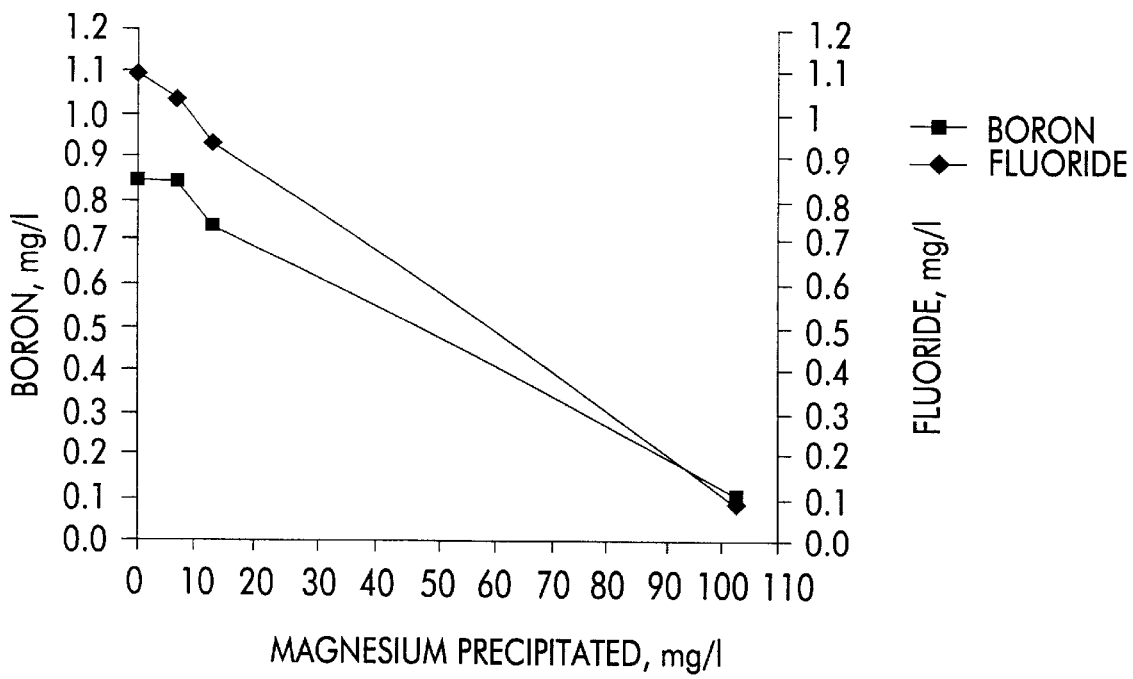

Test results for J3-1 to 3-8 are summarized in Table 4 and are illustrated graphically in FIGS. 2 and 3. Graphs are presented for the amount of boron and fluoride remaining in the test samples versus the amount of magnesium that was precipitated at the various pH values of each jar. Based on these results, it is evident that for tests J3-1 to J3-3, with the pH ranging from 9.43 to 10.21, very little magnesium precipitated even though over 40% of the silicon was precipitated, virtually no boron was removed, and insufficient fluoride was removed to meet the treatment target limit of 0.87 mg/L F max.

In test J3-4, the residual boron concentration was 0.488 mg/L and the fluoride concentration was 0.792 mg/L—both concentrations being well below the respective treatment goal target limits of 0.61 mg/L for boron and 0.87 mg/L for fluoride.

The low concentrations of boron and fluoride in jar J3-4 were achieved with the precipitation of 26.2 mg/l of Mg (60.4%) and the reduction of silicon from 21.7 mg/l to 9.0 mg/L. Also in jar J3-4, with a final treatment pH of 10.4, the TDS before neutralization was reduced from 566

TABLE 4

| Sample ID | $Ca(OH)_2$ Added mg/l | pH s.u. | pH After 30 min. | TDS mg/l | Conduct. umhos/cm | F mg/l | B mg/l | Mg mg/l | Si mg/l | $H_2SO_4$ added mg/l | Neut'd pH s.u. | (AN) TDS mg/l | (AN) Conduct. umhos/cm |
|---|---|---|---|---|---|---|---|---|---|---|---|---|---|
| Blank | | 8.08 | | | | 1.44 | .903 | 23.4 | 21.7 | | | | |
| J3-1 | 244.4 | 9.47 | 9.43 | 440 | 662 | 1.12 | .848 | 40.8 | 8.9 | 81.2 | 7.58 | 468 | 700 |
| J3-2 | 311.1 | 9.85 | 9.85 | 426 | 638 | 1.07 | .843 | 39.6 | 7.8 | 135.4 | 7.57 | 458 | 688 |
| J3-3 | 377.7 | 10.24 | 10.21 | 418 | 630 | 1.04 | .837 | 36.3 | 8.4 | 145.2 | 7.51 | 448 | 672 |
| J3-4 | 466.7 | 10.75 | 10.4 | 373 | 562 | 0.792 | .488 | 17.2 | 9.0 | 100.9 | 7.49 | 382 | 578 |
| Blank | | 8.08 | | | | | | 127 | 21.7 | | | | |
| J3-5 | 222.3 | 9.22 | 9.21 | 696 | 1044 | 1.11 | .851 | 127 | 21.7 | 150.2 | 7.52 | 740 | 1112 |
| J3-6 | 288.9 | 9.61 | 9.62 | 676 | 1014 | 1.05 | .849 | 120 | 21.5 | 115.7 | 7.46 | 722 | 1084 |
| J3-7 | 377.7 | 10.10 | 9.97 | 654 | 981 | 0.939 | .741 | 114 | 15.8 | 107.8 | 7.47 | 692 | 1039 |
| J3-8 | 688.9 | 10.54 | 10.49 | 584 | 877 | 0.066 | .087 | 24.6 | 1.1 | 49.2 | 4.6 | 572 | 859 |

Notes
[1]This test was done with 750 ml samples of Meikle Mine well water at 100° F.
[2]TDS were measured by electrical conductivity meter.

TABLE 4-continued

| Sample ID | Ca(OH)$_2$ Added mg/l | pH s.u. | pH After 30 min. | TDS mg/l | Conduct. umhos/cm | F mg/l | B mg/l | Mg mg/l | Si mg/l | H$_2$SO$_4$ added mg/l | Neut'd pH s.u. | (AN) TDS mg/l | (AN) Conduct. umhos/cm |
|---|---|---|---|---|---|---|---|---|---|---|---|---|---|

[3]Results for the blank are those from Jar Test #1.
[4](AN) = after neutralization mg/l to 373 mg/l (based on electrical conductivity measurement)- or by 34.1%. After neutralization with sulfuric acid to a pH of 7.49, the TDS concentration was 382 mg/L. The TDS concentrations before and after neutralization are reasonably close to the treatment goal target limit of 358 mg/L, considering the results by electrical conductivity are not very accurate at high concentrations and could be lower had the analytical weight method been used for the analysis.

In jars J3-5 to 3-8, with the high dosage of 80 mg/L Mg, the results were similar to those with 20 mg/L Mg dosage except that the reductions in boron and fluoride were significantly higher at the higher Mg dosage.

In jar J3-8, with a pH of 10.49 and before neutralization, the boron concentration was reduced to 0.087 mg/L and fluoride was reduced to 0.066 mg/L. Also, Mg was reduced from 127 mg/L in the blank to 24.6 mg/L and Si from 21.7 mg/L in the blank to 1.1 mg/L in the treated sample.

On the basis of the foregoing, therefore, it is concluded that the addition of magnesium to the feed water at a high pH will reduce the concentrations of boron and fluoride to the desired target limits. In particular, in comparing results for jars J3-5, 6 and 7 with those of jars J3-8, it is evident very little boron and insufficient amounts of fluoride are removed with no precipitation, or very little precipitation of Mg and Si. With magnesium sulfate as the source of magnesium for coagulation, care must be taken in selecting a Mg dosage for the removal of boron and fluoride which is high enough to reach the target boron and fluoride levels but low enough in order to also meet the TDS target limit.

EXAMPLE 2

Figure 4:
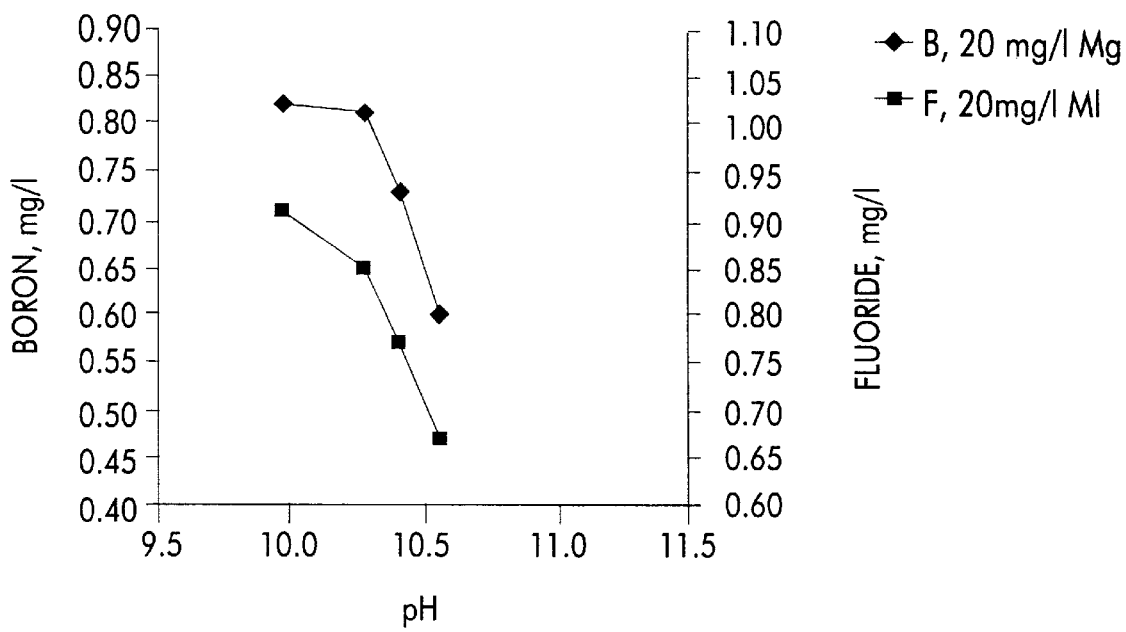
Figure 5:
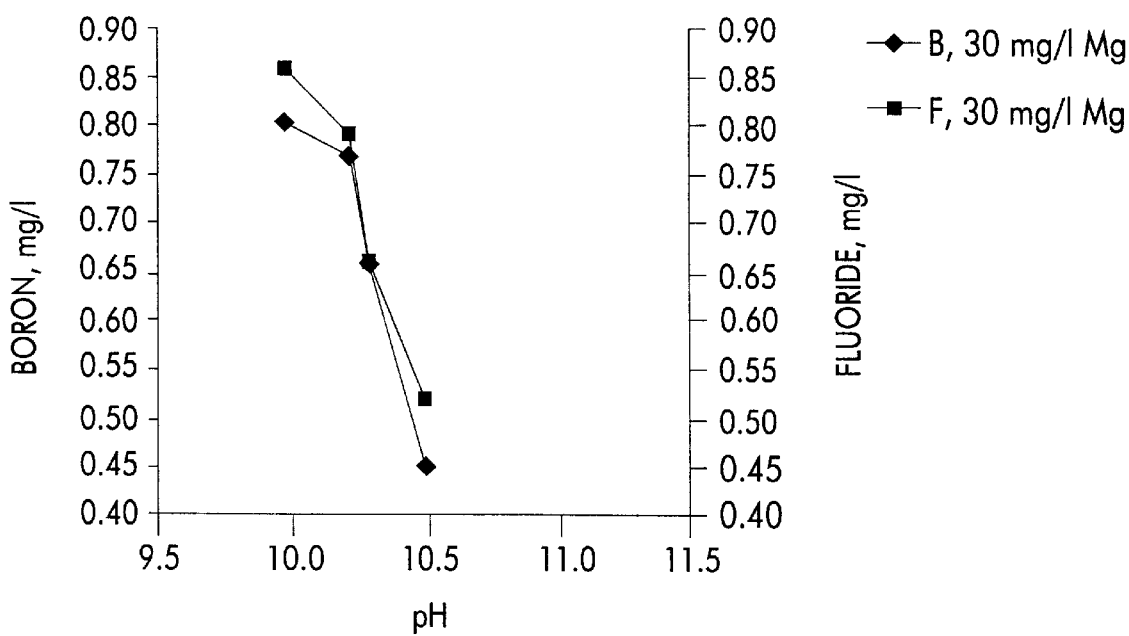

Meikle Mine well water (750 ml) was added to jars J11-1 to J11-4 and preheated to 100° F. (38° F.) by immersion in a water bath. Magnesium sulfate (20 g/L) as a solution of magnesium (25 mg/L MgSO$_4$ concentration) was added to each jar while mixing at 30 rpm and holding the temperature constant at 100° F. (38° F.). The pH of each jar was raised by adding sufficient hydrated lime slurry containing 25 g/L Ca(OH)$_2$. Mixing was continued at 30 rpm for 30 minutes and, after mixing, the pH of each jar was recorded. Test samples were filtered and analyzed for several analytes, then neutralized and the acid consumption was determined. The dried filter residue was weighed to determine the amount of solids produced. The tests were repeated with jars J11-5 to J11-8 using 30 mg/L Mg. The test results are summarized in Tables 5 to 7 and illustrated graphically in FIGS. 4 and 5.

Raw water quality, as represented by the results for the blank in Table 6, is fairly representative of the Meikle well water quality encountered during the testing. The original pH of the water was 7.81 and the TDS was about 512 mg/L as measured by electrical conductivity. The actual concentrations of TDS vary somewhat from the values given since measurement of TDS by conductivity is inferred and varies with pH. Discrepancies between the two methods of measurement normally increase at high pH.

With 20 mg/L Mg, the initial boron concentration of 0.986 mg/L was reduced to 0.60 mg/L before neutralization of the treated sample in jar J11-4 at pH 10.55.

With a higher magnesium dosage of 30 mg/L, equivalent boron reductions to those obtained with 20 mg/L Mg dose were achieved at lower pH values. In jar J11l-7, with a pH of 10.27 after treatment, the boron was reduced to 0.656 mg/L before neutralization. In jar J11-8 with a pH of 10.48, the residual boron concentration was 0.45 mg/L before neutralization. One especially preferred process therefore involves a magnesium dose of about 30 mg/L and an operating pH of about 10.3. In another preferred process with a slightly higher pH of about 10.5, the boron concentration is also well below the objective target limit. With a 20 mg/L Mg dose, the fluoride residual in jar J11-2 at pH of 10.27 was 0.85 mg/L, in jar J11-3 at a pH of 10.40 it was 0.77 mg/L, and in jar J11-4 at a pH of 10.55 it was 0.67 mg/L. All fluoride concentrations in these jars were below the objective target limit of 0.87 mg/L. It is therefore discovered that fluoride can be reduced to the target limit over a pH range of about 10.2 to about 10.6, and within this range the operating pH can be predicated upon the requirements for the removal of boron and TDS.

With the 30 mg/L dose, the fluoride target limit was achieved in all jars, J11-5 to J11-8. In jar J11-7 with a pH of 10.27, the residual fluoride concentration was 0.66 mg/L and in jar J11-8 with a pH of 10.48, it was 0.52 mg/L.

Based on the target boron and fluoride reductions, especially preferred processes embody the test conditions for jars J11-4, J11-7 and J11-8. In jar J11-4 with a pH of 10.55, the TDS before neutralization was reduced to 363 mg/L, which is acceptable in view of the target limit of 358 mg/L. In jars J11-7 and J11-8, with treatment pH values of 10.27 and 10.48 respectively, the respective TDS concentrations before neutralization were 397 and 375 mg/L. These concentrations are above the target limit of 358 mg/L and seem to be influenced by the higher amount of salt added with the higher magnesium dose. There was no significant impact on the TDS concentrations after neutralization to pH 7.5.

TABLE 5

| Sample ID | Mg[2] Added mg/l | Target pH | Ca(OH)$_2$ added mg/l | pH After Ca(OH)$_2$ | pH after 30 min. test | (1) pH Actual | (1) H$_2$SO$_4$ mg/l | (2) pH Actual | (2) H$_2$SO$_4$ mg/l | (3) pH Actual | (3) H$_2$SO$_4$ mg/l |
|---|---|---|---|---|---|---|---|---|---|---|---|
| Blank | | 7.81* | | | | | | | | | |
| J11-1 | 20 | 10.00 | 290.0 | 9.98 | 9.97 | 8.51 | 73.9 | 8.00 | 84.4 | 7.53 | 94.92 |
| J11-2 | 20 | 10.20 | 333.3 | 10.23 | 10.27 | | | | | 6.85 | 106.1 |

TABLE 5-continued

| Sample ID | Mg[2] Added mg/l | Target pH | Ca(OH)$_2$ added mg/l | pH After Ca(OH)$_2$ | pH after 30 min. test | (1) pH Actual | (1) H$_2$SO$_4$ mg/l | (2) pH Actual | (2) H$_2$SO$_4$ mg/l | (3) pH Actual | (3) H$_2$SO$_4$ mg/l |
|---|---|---|---|---|---|---|---|---|---|---|---|
| J11-3 | 20 | 10.40 | 366.7 | 10.47 | 10.40 | 8.47 | 70.9 | 8.00 | 77.4 | 7.49 | 90.3 |
| J11-4 | 20 | 10.60 | 400.0 | 10.65 | 10.55 | 8.52 | 54.2 | 7.96 | 61.8 | 7.50 | 66.7 |
| Blank |  |  |  |  |  |  |  |  |  |  |  |
| J11-5 | 30 | 10.60 | 293.3 | 9.98 | 9.96 | 8.51 | 70.9 | 8.01 | 80.4 | 7.46 | 87.4 |
| J11-6 | 30 | 10.20 | 333.3 |  | 10.20 | 8.52 | 71.9 | 8.02 | 77.4 | 7.51 | 82.3 |
| J11-7 | 30 | 10.20 | 366.7 |  | 10.27 | 8.46 | 61.0 | 8.00 | 63.2 | 7.48 | 69.4 |
| J11-8 | 30 | 10.60 | 420.0 | 10.52 | 10.48 | 8.52 | 46.4 | 7.99 | 50.6 | 7.52 | 53.0 |

*original pH of sample.
Notes
[1]The test was done with 750 ml samples of Meikle Mine well water at 100° F.
[2]Added as Magnesium Sulfate.
[3](1) = Target pH 8.5; (2) = Target pH 8.0; (3) = Target pH 7.5

TABLE 6

| Sample ID | pH After 30 min. test | TDS mg/l | Conduct. umhos/cm | F mg/l | (AN) TDS mg/l | (AN) Conduct. umhos/cm | B mg/l | Mg mg/l | Si mg/l | Ca mg/l | Mn mg/l | Fe mg/l |
|---|---|---|---|---|---|---|---|---|---|---|---|---|
| Blank | 7.81* | 512 | 768 | 1.31 |  |  | 0.986 | 25.0 | 22.9 | 95.5 | <0.01 | 0.39 |
| J11-1 | 9.97 | 406 | 608 | 0.91 | 432 | 650 | 0.824 | 33.1 | 19.5 | 6.6 | <0.01 | <0.07 |
| J11-2 | 10.27 | 395 | 592 | 0.85 | 420 | 628 | 0.814 | 28.8 | 17.5 | 7.3 | <0.01 | <0.07 |
| J11-3 | 10.40 | 374 | 562 | 0.77 | 381 | 572 | 0.729 | 20.7 | 13.3 | 8.0 | <0.01 | <0.07 |
| J11-4 | 10.55 | 363 | 545 | 0.67 | 358 | 537 | 0.600 | 13.7 | 11.2 | 9.6 | <0.01 | <0.07 |
| Blank |  |  |  |  |  |  |  |  |  |  |  |  |
| J11-5 | 9.96 | 438 | 657 | 0.86 | 464 | 697 | 0.804 | 42.1 | 20.2 | 8.1 | <0.01 | <0.07 |
| J11-6 | 10.20 | 422 | 632 | 0.79 | 439 | 659 | 0.769 | 35.5 | 16.0 | 8.6 | <0.01 | <0.07 |
| J11-7 | 10.27 | 397 | 596 | 0.66 | 404 | 607 | 0.656 | 27.0 | 12.4 | 9.2 | <0.01 | <0.07 |
| J11-8 | 10.48 | 375 | 563 | 0.52 | 370 | 555 | 0.45 | 14.5 | 8.6 | 12.6 | <0.01 | <0.07 |

*original pH of sample
Note
[1]TDS was measured by electrical conductivity
[2](AN) after neutralization

TABLE 7

| Sample ID | Mg[1] Added mg/l | Ca(OH)$_2$ Added mg/l | pH After 30 min. test | TDS mg/l | Conduct. umhos/cm | F mg/l | B mg/l | Mg mg/l | Si mg/l | H$_2$SO$_4$ Added mg/l | Neut'd pH s.u. | (AN) TDS mg/l | (AN) Conduct. umhos/cm |
|---|---|---|---|---|---|---|---|---|---|---|---|---|---|
| Blank |  |  |  | 512 | 768 | 1.31 | .986 | 25.0 | 22.9 |  |  |  |  |
| J11-1 | 20 | 290.0 | 9.97 | 406 | 608 | 0.91 | .824 | 33.1 | 19.5 | 94.92 | 7.53 | 432 | 650 |
| J11-2 | 20 | 333.3 | 10.27 | 395 | 592 | 0.85 | .814 | 28.8 | 17.5 | 106.1 | 6.85 | 420 | 628 |
| J11-3 | 20 | 366.7 | 10.40 | 374 | 562 | 0.77 | .729 | 20.7 | 13.3 | 90.3 | 7.49 | 381 | 572 |
| J11-4 | 20 | 400.0 | 10.55 | 363 | 545 | 0.67 | .600 | 13.7 | 11.2 | 66.7 | 7.50 | 358 | 537 |
| Blank |  |  |  |  |  |  |  |  |  |  |  |  |  |
| J11-5 | 30 | 293.3 | 9.96 | 438 | 657 | 0.86 | .804 | 42.1 | 20.2 | 87.4 | 7.46 | 464 | 697 |
| J11-6 | 30 | 333.3 | 10.20 | 422 | 632 | 0.79 | .769 | 35.5 | 16.0 | 82.3 | 7.51 | 439 | 659 |
| J11-7 | 30 | 366.7 | 10.27 | 397 | 596 | 0.66 | .656 | 27.0 | 12.4 | 69.4 | 7.48 | 404 | 607 |
| J11-8 | 30 | 420.0 | 10.48 | 375 | 563 | 0.52 | .450 | 14.5 | 8.6 | 53.0 | 7.52 | 370 | 555 |

Notes
[1]Mg added as Magnesium Sulfate.
[2](AN) = after neutralization

In jars J11-4 and J11-8, there was a decrease from the values obtained before neutralization and in jar J11-7, the concentration increased by 7 mg/L to 404 mg/L.

The lime [Ca(OH)$_2$] consumption in jar J11-4 to achieve a treatment pH of 10.55 was 400 mg/L or 3.34 lbs Ca(OH)$_2$ per 1000 gallons of water to be treated. In jar J11-7, 366.7 mg/L (3.06 lbs/1000 gallons) of lime was required to raise the pH to 10.27, and in jar J11-8, 420 mg/L (3.50 lbs/1000 gallons) of lime was required to raise the pH to 10.48.

The amount of sulfuric acid consumed to neutralize treated water samples to pH of about 7.5 was 66.7 mg/L (0.56 lb/1000 gallons) in jar J11-4, 69.4 mg/L (0.58 lb/1000 gallons) in jar J11-7, and 53.0 mg/L (0.44 lb/1000 gallons) in jar J11-8. The acid amounts required for target pH values of 8.0 and 8.5 are presented in Table 5.

On the basis of the foregoing, it is concluded that treatment goals for TDS, fluoride and boron can be reached by lime softening with the addition of 20 mg/L Mg at a pH of about 10.6 as indicated by the results of jar test J11-4.

It is evident that for the same magnesium dosage the higher pH results in a greater reduction of fluoride and boron. The preferred maximum pH is 10.6, in this application, to limit the degree of softening to the level where treatment target levels are achieved. The degree of removal of these elements appears to be a function of the amounts of magnesium and silica that are precipitated in the reaction.

EXAMPLE 3

The procedure of Example 2 was performed using jars J12-1 to J12-4, except the dosage was 15 mg/L of magnesium as a solution of magnesium sulfate (concentration 25 g/L $MgSO_4$) added to each jar. The tests were repeated with jars J12-5 to J12-8 using 25 mg/L Mg as the magnesium dosage.

Figure 6:
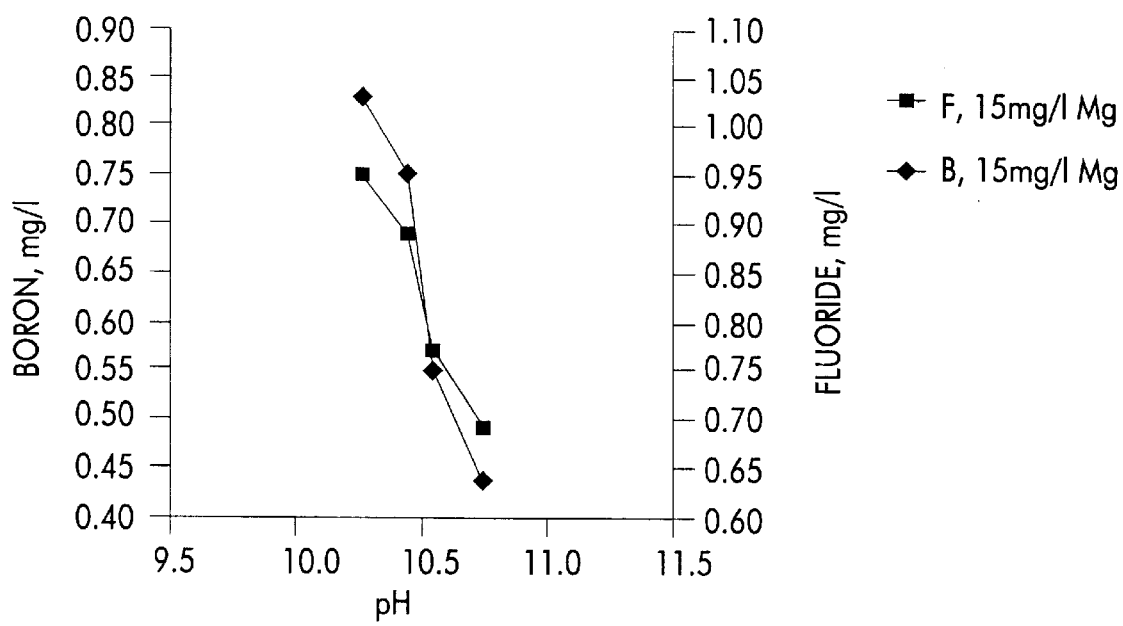
Figure 7:
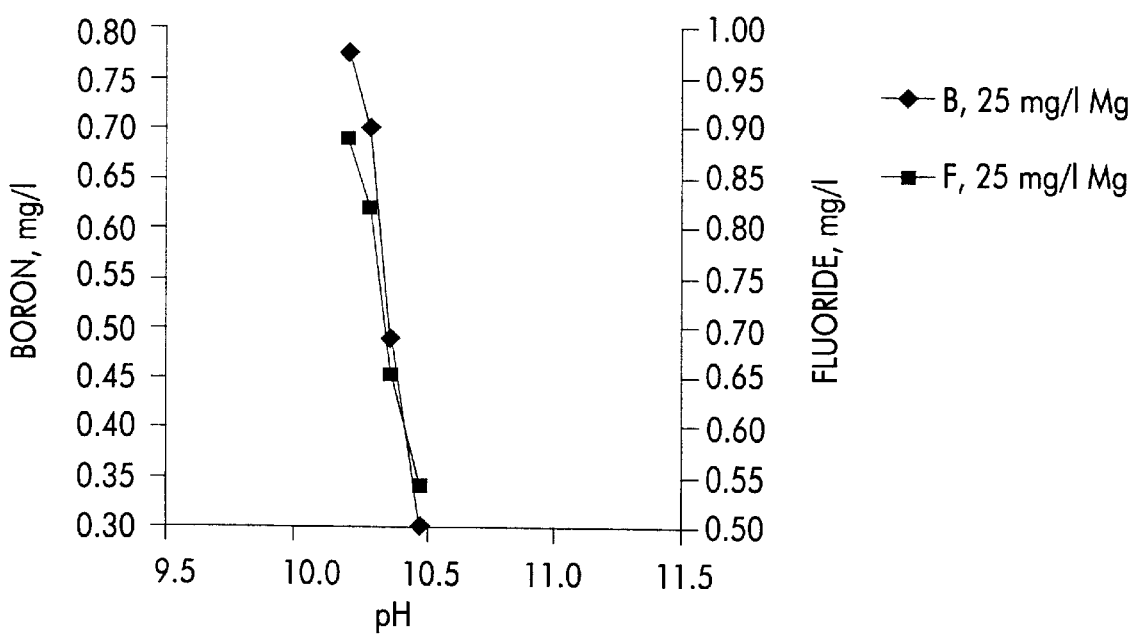

Test results are presented in Tables 8 to 10. Residual boron and fluoride concentrations after the tests are plotted against pH in FIGS. 6 and 7. The initial pH was 7.81, the TDS concentration was 512 mg/L, the fluoride concentration was 1.31 mg/L, and the boron concentration was 0.986 mg/L. The target limit for boron of 0.61 mg/L was achieved with a 15 mg/L Mg dosage in jar J12-3 at a pH of 10.54 and in jar J12-4 at a pH of 10.74; the residual boron concentrations being 0.547 mg/L and 0.434 mg/L before neutralization for the two respective jars.

With the higher dosage of 25 mg/L Mg (J12-5 to J12-8), similar boron reductions were achieved as for jars J12-3 and J12-4 but at a lower treatment pH. For example, in jar J12-7, the pH was 10.37 and boron residual concentrations were 0.489 mg/L before neutralization. In jar J12-8, the pH was 10.48 and boron residual concentration was 0.3 mg/L.

The fluoride target limit of 0.87 mg/L was achieved with a 15 mg/L Mg dosage in jars J12-2 at pH 10.43, J12-3 at pH 10.54, and J12-4 at 10.74, final concentrations being 0.89 mg/L, 0.77 mg/L and 0.69 mg/L, respectively, before neutralization. With a magnesium dosage of 25 mg/L, the fluoride target limit was achieved in jars J12-6 at pH 10.28, J12-7 at pH 10.37, and J12-8 at pH 10.48. The respective residual fluoride concentrations in jars J12-6 to J12-8 were 0.82 mg/L, 0.65 mg/L and 0.54 mg/L. These test results indicate that at equal treatment pH values more fluoride can be removed with the higher magnesium dosage.

With regard to TDS, the test results of jars J12-3 and J12-4 show that the treatment goal target limit of 358 mg/L can be met with the lower magnesium dosage of 15 mg/L at operating pH values of 10.54 or 10.74 in the two respective jars. The actual TDS test values recorded were 338 mg/L for jar J12-3 and 336 mg/L for jar J12-4. At the higher magnesium dosage the target limit for TDS was not achieved. It appears that at pH 10.25 and over all of the original calcium carbonate alkalinity is precipitated and any further increases in pH will add excess calcium hydroxide alkalinity to the water. Also, with the higher magnesium dosage the added sulfate becomes significant and impacts on the total dissolved solids content of the water.

The lime consumption in jar J12-3 with a 15 mg/L Mg dose was 366.7 mg/L (3.06 lbs/1000 gallons) to achieve a treatment pH of 10.54 and the acid consumption for neutralization to pH 7.29 was 69.9 mg/L (0.58 lb/1000 gallons). For a dose of 25 mg/L Mg in jar J12-7, the lime consumption was the same at 366.7 mg/L (3.06 lbs/1000 gallons) to achieve a treatment pH of 10.37 and the acid consumption for neutralization to pH 7.49 was 68.8 mg/L (0.57 lb/1000 gallons).

TABLE 8

| Sample ID | $Mg^2$ Added mg/l | $Ca(OH)_2$ Added mg/l | pH After $Ca(OH)_2$ | pH After 30 min. test | (1) pH Actual | (1) $H_2SO_4$ mg/l | (2) pH Actual | (2) $H_2SO_4$ mg/l | (3) pH Actual | (3) $H_2SO_4$ mg/l |
|---|---|---|---|---|---|---|---|---|---|---|
| Blank | | | | | | | | | | |
| J12-1 | 15 | 290.0 | 10.25 | 10.25 | 8.50 | 81.7 | 8.00 | 88.5 | 7.49 | 95.2 |
| J12-2 | 15 | 331.7 | 10.55 | 10.43 | 8.50 | 75.9 | 8.01 | 76.7 | 7.49 | 85.4 |
| J12-3 | 15 | 366.7 | 10.76 | 10.54 | 8.50 | 54.8 | 7.96 | 62.5 | 7.29 | 69.9 |
| J12-4 | 15 | 403.3 | 10.88 | 10.74 | 8.43 | 49.6 | 7.93 | 52.5 | 7.42 | 55.9 |
| Blank | | | | | | | | | | |
| J12-5 | 25 | 290.0 | 10.21 | 10.20 | 8.52 | 83.5 | 8.02 | 91.4 | 7.50 | 100.2 |
| J12-6 | 25 | 330.0 | 10.49 | 10.28 | 8.49 | 63.9 | 8.04 | 66.8 | 7.51 | 74.7 |
| J12-7 | 25 | 366.7 | 10.68 | 10.37 | 8.52 | 49.1 | 7.99 | 63.9 | 7.49 | 68.8 |
| J12-8 | 25 | 427.3 | 10.80 | 10.48 | 8.51 | 35.4 | 7.91 | 39.0 | 7.51 | 43.9 |

Notes
[1]The test was done with 750 ml samples of Meikle Mine well water at 100° F.
[2]Mg added as Magnesium Sulfate.
[3](1) = Target pH 8.5; (2) = Target pH 8.0; (3) = Target pH 7.5

TABLE 9

| Sample ID | pH After test | TDS mg/l | Conduct. umhos/cm | F mg/l | (AN) TDS mg/l | (AN) Conduct. umhos/cm | B mg/l | Mg mg/l | Si mg/l | Ca mg/l | Mn mg/l | Fe mg/l |
|---|---|---|---|---|---|---|---|---|---|---|---|---|
| Blank | 7.81* | 512 | 768 | 1.31 | | | 0.986 | 25.0 | 22.9 | 95.5 | | |
| J12-1 | 10.25 | 385 | 577 | 0.95 | 413 | 619 | 0.831 | 27.8 | 19.8 | 7.59 | 0.18 | 0.09 |
| J12-2 | 10.43 | 359 | 539 | 0.89 | 376 | 565 | 0.752 | 18.9 | 15.4 | 7.98 | 0.18 | 0.091 |

TABLE 9-continued

| Sample ID | pH After test | TDS mg/l | Conduct. umhos/cm | F mg/l | (AN) TDS mg/l | (AN) Conduct. umhos/cm | B mg/l | Mg mg/l | Si mg/l | Ca mg/l | Mn mg/l | Fe mg/l |
|---|---|---|---|---|---|---|---|---|---|---|---|---|
| J12-3 | 10.54 | 338 | 508 | 0.77 | 342 | 513 | 0.547 | 9.5 | 12.3 | 8.00 | 0.18 | 0.095 |
| J12-4 | 10.74 | 336 | 504 | 0.69 | 315 | 473 | 0.434 | 3.0 | 10.6 | 7.28 | 0.18 | 0.096 |
| Blank |   |   |   |   |   |   |   |   |   |   |   |   |
| J12-5 | 10.20 | 415 | 623 | 0.89 | 442 | 662 | 0.775 | 36.0 | 19.0 | 7.75 | 0.1 | <0.14 |
| J12-6 | 10.28 | 390 | 586 | 0.82 | 408 | 612 | 0.701 | 27.4 | 15.0 | 8.6 | 0.10 | <0.14 |
| J12-7 | 10.37 | 366 | 550 | 0.65 | 371 | 556 | 0.489 | 16.6 | 11.2 | 9.3 | 0.1 | <0.14 |
| J12-8 | 10.48 | 350 | 525 | 0.54 | 342 | 511 | 0.3 | 7.38 | 8.34 | 10.6 | 0.1 | <0.14 |

*Original sample water.
Notes
[1]TDS was measured by electrical conductivity.
[2](AN) = after neutralization

TABLE 10

| Sample ID | Mg[1] Added mg/l | Ca(OH)$_2$ Added mg/l | pH After 30 min. test | TDS mg/l | Conduct. umhos/cm | F mg/l | B mg/l | Mg mg/l | Si mg/l | H$_2$SO$_4$ Added mg/l | Neut'd pH s.u. | (AN) TDS mg/l | (AN) Conduct. umhos/cm |
|---|---|---|---|---|---|---|---|---|---|---|---|---|---|
| Blank |   |   |   | 512 | 768 | 1.31 | .986 | 25.0 | 22.9 |   |   |   |   |
| J12-1 | 15 | 290 | 10.25 | 385 | 577 | 0.95 | .831 | 27.8 | 19.8 | 95.2 | 7.49 | 413 | 619 |
| J12-2 | 15 | 331.7 | 10.43 | 359 | 539 | 0.89 | .752 | 18.9 | 15.4 | 85.4 | 7.49 | 376 | 565 |
| J12-3 | 15 | 366.7 | 10.54 | 338 | 508 | 0.77 | .547 | 9.5 | 12.3 | 69.9 | 7.29 | 342 | 513 |
| J12-4 | 15 | 403.3 | 10.74 | 336 | 504 | 0.69 | .434 | 3.0 | 10.6 | 55.9 | 7.42 | 315 | 473 |
| Blank |   |   |   |   |   |   |   |   |   |   |   |   |   |
| J12-5 | 25 | 290.0 | 10.20 | 415 | 623 | 0.89 | .775 | 36.0 | 19.0 | 100.2 | 7.50 | 442 | 662 |
| J12-6 | 25 | 330.0 | 10.28 | 390 | 586 | 0.82 | .701 | 27.4 | 15.0 | 74.7 | 7.51 | 408 | 612 |
| J12-7 | 25 | 366.7 | 10.37 | 366 | 550 | 0.65 | .489 | 16.6 | 11.2 | 68.8 | 7.49 | 371 | 556 |
| J12-8 | 25 | 427.3 | 10.48 | 350 | 525 | 0.54 | .3 | 7.38 | 8.34 | 43.9 | 7.51 | 342 | 511 |

Notes
[1]Mg added as Magnesium Sulfate (MgSO$_4$).
[2](AN) = after neutralization Based on the foregoing, it is concluded that treatment goals for TDS, fluoride and boron can be reached by lime softening with the addition of 15 mg/L Mg at a pH of 10.54 as indicated by the results of jar test J12-3. Also, at equal pH values, the higher magnesium dosage will result in higher reductions of boron and fluoride. The conclusion drawn in Example 2 that the degree of removal of boron and fluoride is a function of the amounts of magnesium and silica that are precipitated in the reaction is reaffirmed by the results of the Example 3.

In the interest of meeting the treatment goals and minimizing chemical consumption, the pH of about 10.55 appears to be most preferred.

EXAMPLE 4

Meikle Mine well water (750 ml) was added to jars J13-1 to J13-4 and preheated to 100° F. (38° F.) by immersion in a water bath. Magnesium (20 mg/L Mg) as a solution of magnesium sulfate (25 g/L MgSO$_4$ concentration) was added to each jar while mixing at 30 rpm and holding the temperature constant at 100° F. (38° F.). The pH of each jar was raised to 10.75 by adding sufficient hydrated lime slurry containing 25 g/L Ca(OH)$_2$. The solutions in jars J13-1 to J13-4 were mixed at 30 rpm for 5, 10, 15 and 20 minutes, respectively, while maintaining the temperature constant at 100° F. (38° F.). The tests were repeated with jars J13-5 to J13-8 being mixed for 11, 18, 23 and 26 minutes, respectively.

Figure 8:
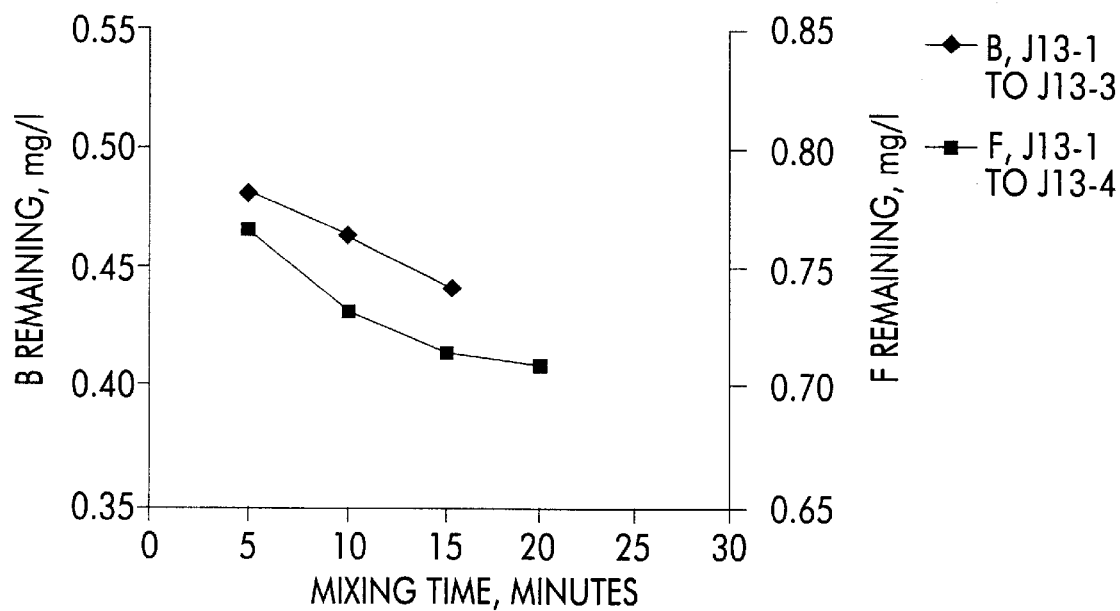
Figure 9:
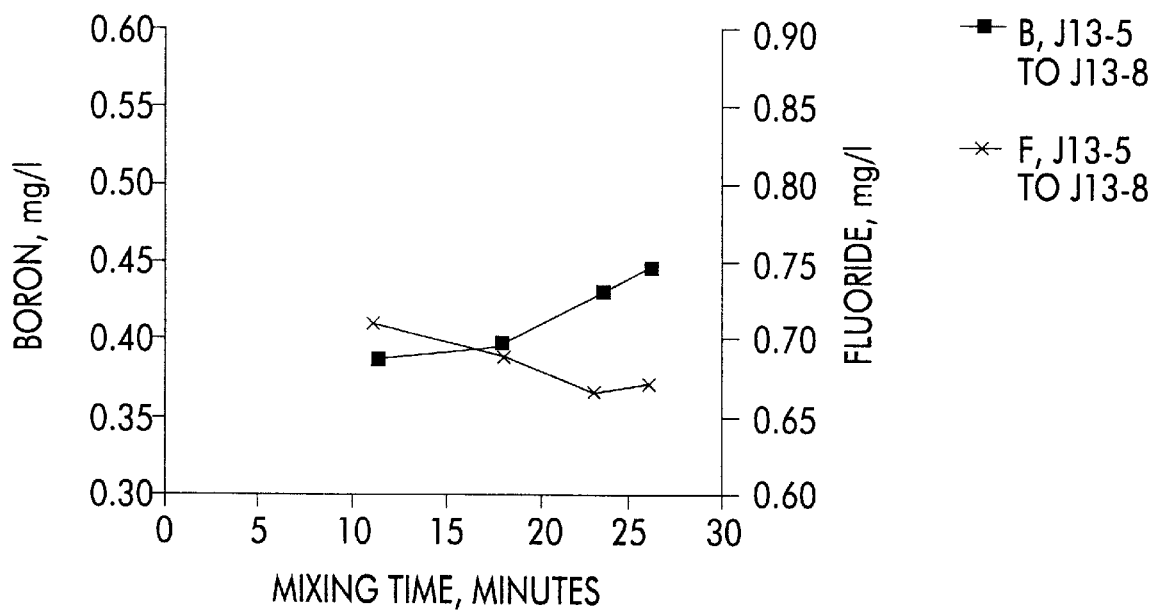
Figure 10:
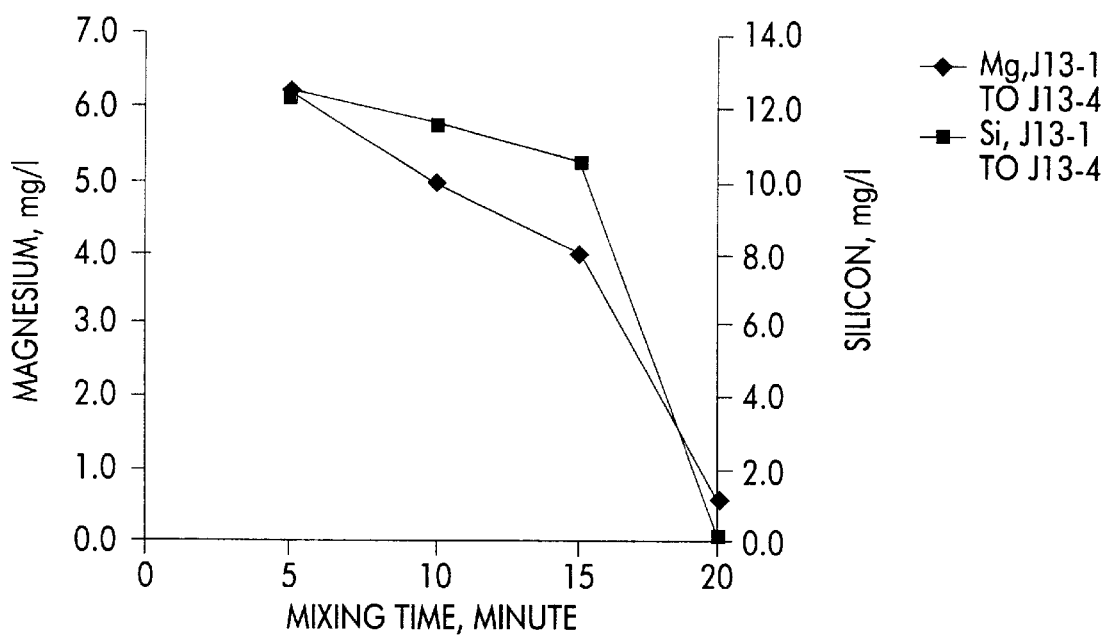
Figure 11:
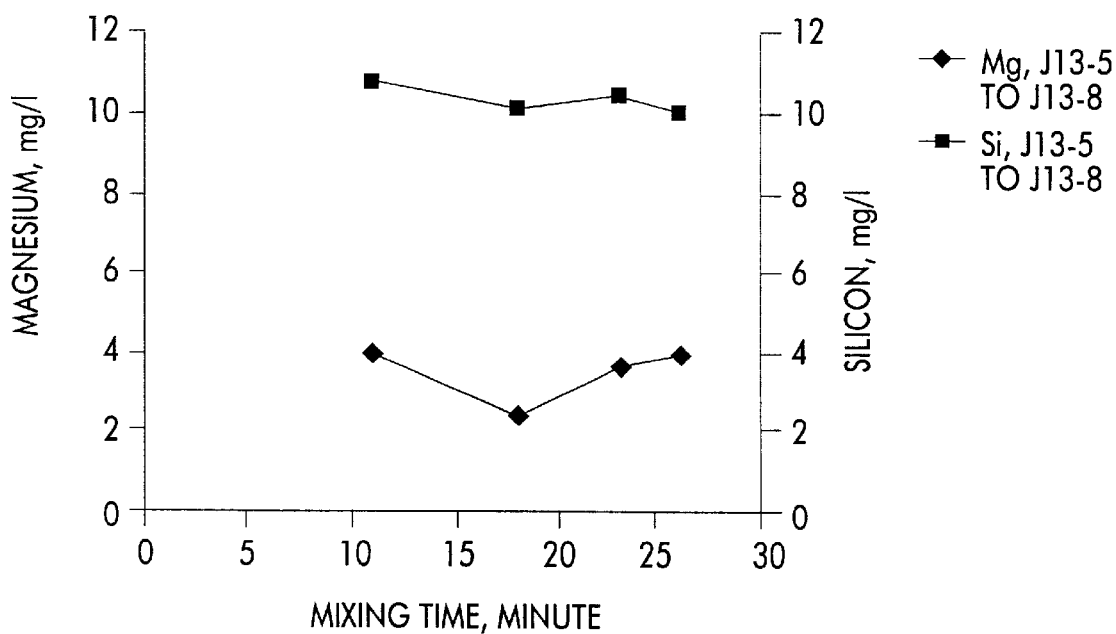

The test results are summarized in Table 11. The results for jar J13-4 before neutralization appeared to be in error and were not used in the evaluation. Instead, the results obtained for after neutralization were used. The boron and fluoride concentrations after the test are plotted against mixing time in FIGS. 8 and 9, and magnesium and fluoride concentrations are plotted against mixing time in FIGS. 10 and 11.

Target limits for boron and fluoride were achieved with 5 minutes of mixing, the shortest time used in the test. Fluoride, however, continued to decrease with mixing time and appeared to be stable after 15 to 18 minutes of mixing (jars J13-3 and J13-6). Boron also continued to decrease with mixing time in jars J13-1 to J13-4 and was lowest in jar J13-4 after 20 minutes of mixing. In jars J13-5 to J13-8, the lowest boron concentration was achieved in jar J13-5 after 11 minutes of mixing. Longer mixing times, such as for jars J13-7 and J13-8, had no further impact on the reduction of boron.

The concentrations of magnesium and silicon continued to decrease with time. In jars J13-1 to J13-4, the lowest concentrations of magnesium and silicon were achieved after 20 minutes of mixing, remaining concentrations being 2.9 and 9.5 mg/L, respectively. In jars J13-5 to J13-8, the lowest concentration of magnesium of 2.4 mg/L was achieved in jar J13-6 after 18 minutes of mixing. However, this minimum magnesium concentration may be due to the high pH of 10.88 of the four jars rather than the mixing time. The silicon, however, continued to decrease and was lowest even after 26 minutes of mixing, albeit, the rate of decrease was substantially lower after the initial 5 minutes of mixing.

TABLE 11

| Sample ID | Mg[3] Added mg/l | Mixing Time min. | Ca(OH)$_2$ Added mg/l | pH After test | TDS mg/l | Conduct. umhos/cm | F mg/l | B mg/l | Mg mg/l | Si Mg/l | H$_2$SO$_4$ Added mg/l | Neut'd pH s.u. | (AN) TDS mg/l | (AN) Conduct. umhos/cm |
|---|---|---|---|---|---|---|---|---|---|---|---|---|---|---|
| Blank | | | | | | | | | | | | | | |
| J13-1 | 15 | 5 | 400 | 10.85 | 375 | 563 | 0.77 | .482 | 6.3 | 12.2 | 84.7 | 7.52 | 340 | 511 |
| J13 2 | 15 | 10 | 400 | 10.78 | 361 | 542 | 0.73 | .464 | 5.0 | 11.5 | 78.3 | 7.50 | 328 | 493 |
| J13-3 | 15 | 15 | 400 | 10.79 | 350 | 526 | 0.71 | .442 | 4.0 | 10.5 | 70.9 | 7.52 | 321 | 483 |
| J13-4 | 15 | 20 | 400 | 10.77 | 353 | 530 | 0.71 | .009 | 0.5 | <0.1 | 7.50 | 71.9 | 317 | 476 |
| Blank | | | | | 437 | 656 | 1.34 | .846 | 23.7 | 19.8 | | | | |
| J13-5 | 15 | 11 | 356.7 | 10.78 | 363 | 545 | 0.71 | .385 | 4.0 | 10.8 | 69.9 | 7.50 | 328 | 492 |
| J13-6 | 15 | 18 | 356.7 | 10.88 | 383 | 575 | 0.69 | .392 | 2.4 | 10.1 | 84.1 | 7.50 | 329 | 494 |
| J13-7 | 15 | 23 | 356.7 | 10.77 | 360 | 541 | 0.67 | .428 | 3.6 | 10.4 | 75.8 | 7.51 | 323 | 485 |
| J13-8 | 15 | 26 | 356.7 | 10.76 | 351 | 528 | 0.67 | .446 | 3.86 | 9.93 | 72.1 | 7.50 | 321 | 483 |

Note
[1]The test was done with 750 ml samples of Meikle Mine well water at 100° F.
[2]TDS were measured by electrical conductivity meter.
[3]Mg added as Magnesium Sulfate.
[4](AN) = after neutralization
[5]The results for B, Mg, and Si removal for test J13-4 in this Table appleear to be in error as noted above.

The results for B, Mg, and Si removal for test J13-4 in this Table appear to be in error as noted above.

Although boron and fluoride treatment goal limits were reached after only 5 minutes of mixing, the optimum reaction time must be based on the softening reaction for the precipitation of magnesium, calcium and silicon. Based on the results of this test, the preferred reaction time in the external reactor appears to be about 15 to 20 minutes. Selection of the optimum time must also be based on economic considerations, since some post-precipitation of the lime softening reaction products, which should be minor, can be allowed to occur in the clarifiers.

EXAMPLE 5

Meikle Mine well water (750 ml) was added to jars J14-1 to J14-4 and preheated to 100° F. (38° F.) by immersion in a water bath. Magnesium (13, 14, 16 and 17 mg/L Mg) as a solution of magnesium sulfate (25 g/L concentration MgSO$_4$) was added to each jar while mixing at 30 rpm and holding the temperature constant at 100° F. (38° F.). The pH of each jar was raised to 10.75 by adding sufficient hydrated lime slurry containing 25 g/L Ca(OH)2 The solutions in jars J14-1 to J14-4 were mixed at 30 rpm for 18 minutes, respectively, while maintaining the temperature constant at 100° F. (38° F.).

Figure 12:
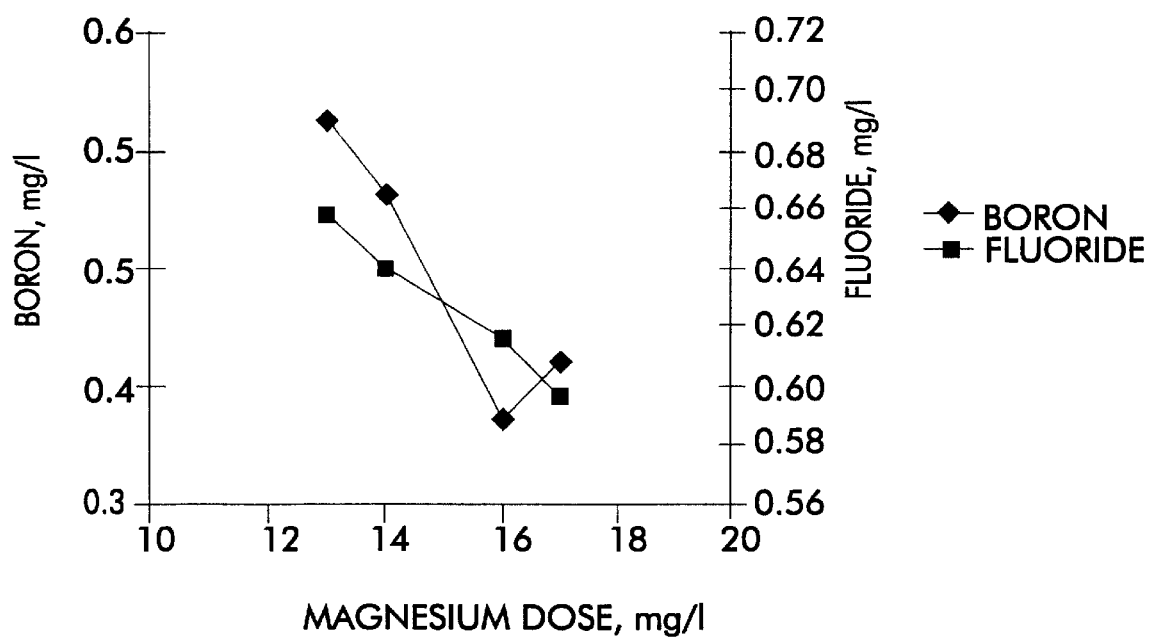
Figure 13:
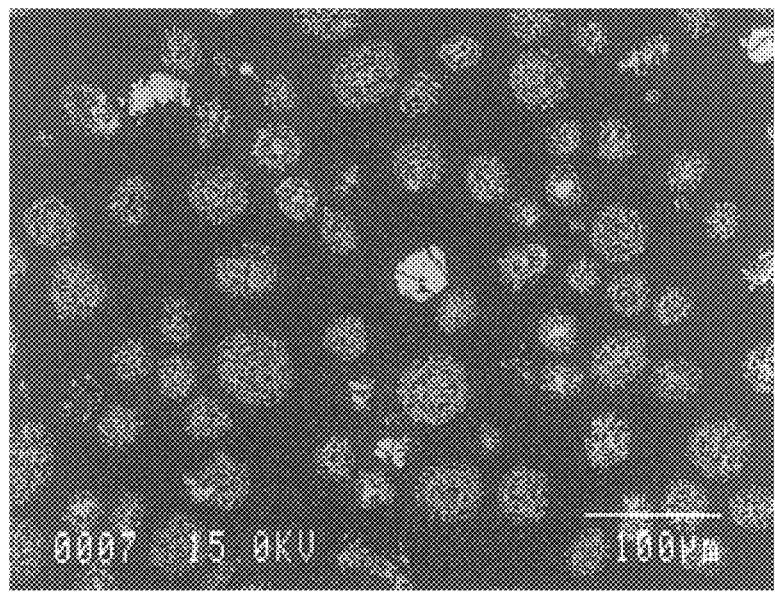
FIGS. 13 to 16 are photomicrographs of sludge particles produced by the water treatment process of the invention.
Figure 14:
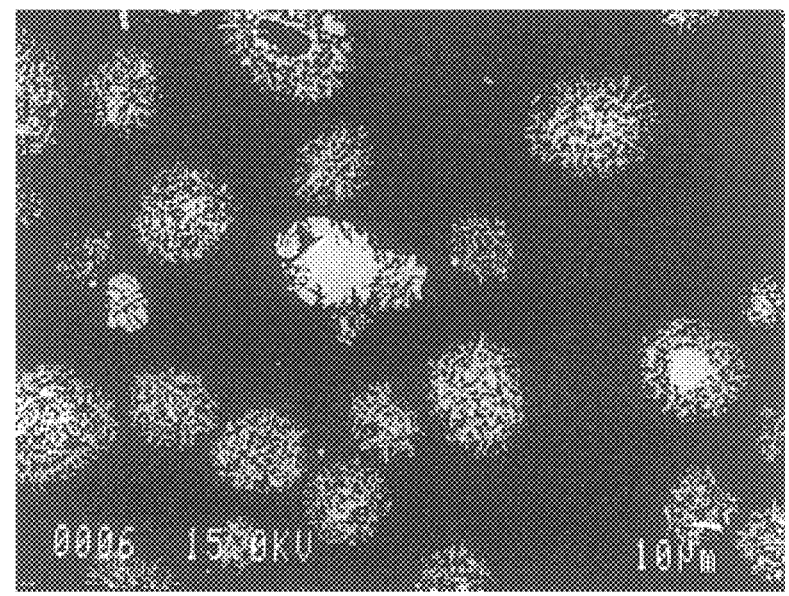
Figure 15:
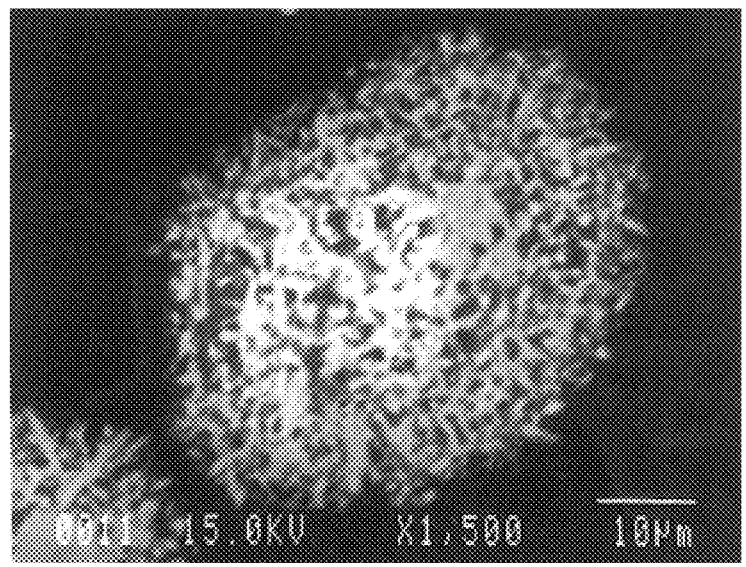
Figure 16:
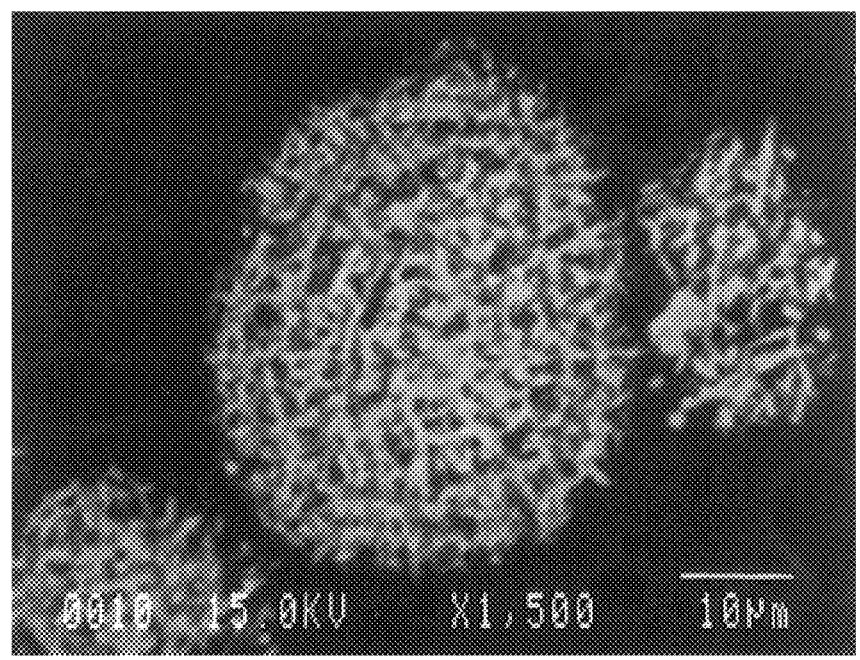

Test results for this example are summarized in Table 12. The boron and fluoride concentrations after the test are plotted against the amount of magnesium added in FIG. 12.

The actual pH in the four jars after the test was 10.67 in jar J14-1, 10.68 in jar 14-2, 10.70 in jar J14-3 and 10.71 in jar J14-4. The lowest boron concentration of 0.396 mg/L was achieved in jar J14-3 with a magnesium dosage of 16 mg/L. For fluoride, the lowest concentration was achieved in jar J14-4 with a magnesium dosage of 17 mg/L.

Silicon continued to decrease with increasing magnesium dosage. It is also noted that the TDS concentrations all exceeded the treatment goal limit of 358 mg/L, possibly because of the high pH resulting in the presence of an excess of calcium hydroxide alkalinity.

On the basis of these test results, it is concluded that based on boron removal, the preferred magnesium dosage is 16 mg/L. Based on fluoride removal, the preferred dosage is 17 mg/L with a treatment pH of about 10.70. Treatment goal limits for boron and fluoride were achieved with the minimum magnesium dose of 13 mg/L and a treatment pH of 10.67.

The reduction of silicon depends upon the amount of magnesium that is precipitated; hence, the lowest concentration is achieved at the highest magnesium dosage.

TABLE 12

| Sample ID | Mg[3] Added mg/l | Mixing Time min. | Ca(OH)$_2$ Added mg/l | pH After 18 min. test | TDS mg/l | Conduct. umhos/cm | F mg/l | B mg/l | Mg mg/l | Si mg/l |
|---|---|---|---|---|---|---|---|---|---|---|
| Blank | | | | | | | | | | |
| J14-1 | 13 | 18 | 433 | 10.67 | 440 | 660 | .66 | .523 | 3.0 | 11.3 |
| J14-2 | 14 | 18 | 436.7 | 10.68 | 426 | 641 | .64 | .492 | 2.8 | 11.2 |
| J14-3 | 16 | 18 | 400 | 10.70 | 438 | 660 | .62 | .396 | 2.5 | 10.8 |
| J14-4 | 17 | 18 | 440 | 10.71 | 444 | 666 | .60 | .420 | 2.6 | 10.4 |

Notes
[1]The test was done with 750 ml samples of Meikle Mine well water at 100° F.
[2]TDS were measured by electrical conductivity meter.
[2]Mg added as Magnesium Sulfate.

EXAMPLE 6

Meikle Mine well water (750 ml) was added to jar J15-1 at ambient temperature of 23.10 C. (73.60 F.) with no preheating. Magnesium (16 mg/L Mg) as a solution of magnesium sulfate (25 g/L MgSO$_4$ concentration) was added to each jar while mixing at 30 rpm and holding the temperature constant at ambient. The pH of each jar was raised to 10.75 by adding sufficient hydrated lime slurry containing 25 g/L Ca(OH)$_2$. The solution was mixed at 30 rpm for 18 minutes.

Test results are summarized in Table 13. The pH after the test was 10.79 and boron and fluoride concentrations were below the established target limits for these parameters. Specifically, the final boron concentration was 0.514 mg/L and the fluoride concentration was 0.71 mg/L. The TDS concentration was 447 mg/L (by electrical conductivity measurement), which is in excess of the target limit of 358 mg/L. In comparing these results with those for jar J14-3 of the previous test, it will be noticed that the results for jar J15-1 are all higher including those for magnesium, silicon and calcium. The reason for this is not entirely clear since higher concentrations may be due to slightly higher solubilities at the lower temperature for these elements rather than because of a slower reaction time.

At ambient temperature, a longer mix time is desirable to minimize post-precipitation in the clarifier. The removal efficiencies for boron and fluoride are slower at the ambient temperature of 73.6° F. compared to those at 100° F. Boron and fluoride removals are sufficient to meet target limits at ambient

TABLE 13

| Sample ID | Mg[3] Added mg/l | Mixing Time min. | Ca(OH)$_2$ Added mg/l | pH After 18 min. test | TDS mg/l | Conduct. umhos/cm | F mg/l | B mg/l | Mg mg/l | Si mg/l |
|---|---|---|---|---|---|---|---|---|---|---|
| Blank | | | | | | | | | | |
| J15-1 | 16 | 18 | | 10.79 | 447 | 671 | .71 | .514 | 12.8 | 13.2 |

Notes
[1]The test was done with a 750 ml sample of Meikle Mine well water at 73.6° F.
[2]TDS were measured by electrical conductivity meter.
[3]Mg added as Magnesium Sulfate.

temperature, hence operating at a much reduced temperature from the normal feed water temperature of 100° F. during the winter months should not significantly impact on the reductions of boron and fluoride.

EXAMPLE 7

Barrick Goldstrike Mines Inc. (Barrick) owns and operates the Goldstrike Mine located approximately 27 miles north of Carlin, Nev. Part of the mining operation involves the control of groundwater by pumping from a network of wells located peripheral to the ore deposits. The water is used in the mining operations as well as for irrigation purposes. The quality and quantity of the discharge of excess groundwater to the Humboldt River is regulated by the Nevada Division of Environmental Protection (NDEP). The discharge limits require reduction of concentrations of total dissolved solids (TDS), fluoride and boron and to lower the temperature of the groundwater prior to discharge. The TDS, fluoride and boron concentrations in the groundwater average about 600 mg/L, 1.4 mg/L and 0.8 mg/L, respectively, and the effluent limits for discharge are 425 mg/L, 1.0 mg/L, and 0.75 mg/L, respectively. The temperature of the groundwater is in the range of 140° F. at the discharge of the pumping wells. The permit requires that the discharge meets the temperature of the Humboldt River within +2° C. The permit also limits the concentration of unionized ammonia nitrogen in the discharge to 0.02 mg/L; the concentration in the raw water varies between 0.80 to 1.20 mg/L ammonia as 30 nitrogen. The maximum permissible rate of discharge is limited to 70,000 gpm (all references to gpm herein are to U.S. gpm).

Figure 1A:
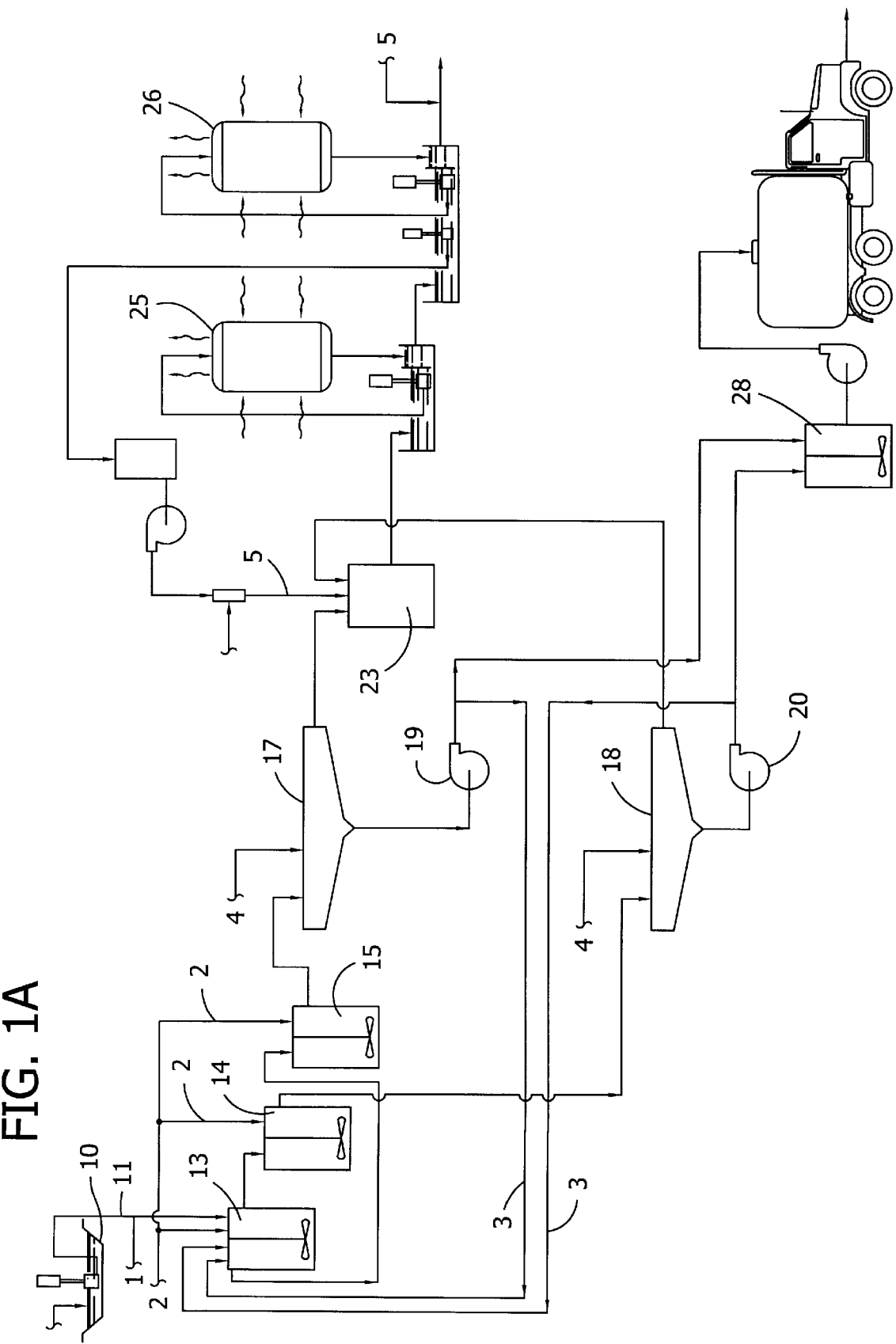
FIG. 1A is a flowsheet describing the principal full scale operations in accordance with the water treatment circuit of the invention.

The treatment process is illustrated in FIG. 1A, and includes raw water storage in a surge pond 10, raw water pumping via a 48 inch diameter pipeline 11 to the treatment facility, lime softening and the reduction of boron and fluoride in three external solids contact reactors 13, 14 and 15, two 210-foot diameter clarifiers 17, 18, sludge pumps 19, 20, re-carbonation and neutralization of the clarified water in an energy dispersion tank 23, cooling in two forced draft countercurrent flow cooling towers 25, 26 each containing ten cells, and clarifier sludge storage tank 28 and loading and unloading facilities for truck transport and reuse of the sludge in the mine's autoclave circuit. The pH of the final cooling tower discharge is adjusted to 7.5 or slightly lower to meet the permit limit for unionized ammonia nitrogen.

Chemical systems include storage, make-up and feed facilities for quicklime, anhydrous magnesium sulfate, an anionic polyelectrolyte, and sulfuric acid. An antiscalent chemical is added to the intake of the raw water pumps to minimize scaling in the pumps and pipeline to the treatment plant.

To enhance the reduction of boron and fluoride, the raw water is preconditioned with magnesium sulfate 1 prior to the water reaching the solids reaction tank, 13. In tank 13, the pH is raised to about 10.3 using a slurry of lime 2. Clarifier underflow solids 3 are recycled to the solids reaction tank 13 to act as a catalyst in the precipitation reactions and to produce larger calcium carbonate crystals which will settle faster in the clarifiers and produce a denser sludge. Lime slurry 2 is added to the external reaction tanks 14 and 15, as necessary, to maintain the target pH. The retention time in tank 13 is about 9.0 minutes based on the design flow rate of 65,000 gpm. Precipitation reactions are completed in the external reaction tanks, 14 and 15. The retention time of each external reaction tank is about 17.0 minutes at one-half of the design flow rate.

Slurry discharging from the external reaction tanks 14 and 15 is conveyed to two 210-foot diameter clarifiers, operating in parallel, for the removal of suspended solids. A flocculant 4 is added to the clarifier influent to increase the efficiency of liquid/solids separation. The clarifiers are sized for a net overflow rate of 1.0 gpm/sq. ft. based on the design flow rate and are equipped with a center pier bridge support, a 50-foot diameter center feed well, radial overflow launders in addition to the peripheral launder, and a rotating sludge rake complete with a hydraulic drive plus power lifting device.

The clarifier overflow discharges to an energy dispersion tank where dilute sulfuric acid 5 is added for re-carbonation and neutralization of the clarifier overflow water to a pH of about 8.3. The water is then treated in two banks of cooling towers for temperature reduction.

Two banks of induced draft cooling towers are provided, each containing ten cells equipped with variable speed fans. The cell dimensions are 54-foot wide by 54-foot long by 49-foot high. The interior fill material consists of grid fill to a depth of about 18 feet. The two banks of cooling towers operate in series. At the end of the second cooling tower basin, the cooled water overflows a weir and discharges into the water conveyance pipeline intake sump. The final pH of the discharge is adjusted to about 7.5 by adding a controlled amount of dilute sulfuric acid 5 through a pipe diffuser located in the cooling tower basin upstream of the

TABLE 14

BARRICK GOLDSTRIKE MINES INC.
BOULDER VALLEY WATER TREATMENT PLANT
PLANT OPERATING DATA

| Sample ID | pH | F | B | Mg | Si | Ca |
|---|---|---|---|---|---|---|
| Raw Feed Water | 8.16 | 1.13 | 0.741 | 23.3 | 19.9 | 59.7 |
| Raw Water with MgSO$_4$ | 8.15 | 1.18 | 0.766 | 34.1 | 20.4 | 62.1 |
| Outlet from Reactor R-1 (after lime addition) | 10.42 | 0.513 | 0.353 | 8.3 | 4.6 | 1.5 |
| Outlet from Reactors R-2 | 10.5 | 0.486 | 0.376 | 6.4 | 3.0 | 1.6 |
| Clarifier Overflow | 10.73 | 0.504 | 0.506 | 4.5 | 3.5 | 3.6 |
| Clarifier Underflow | 10.56 | 0.477 | 0.465 | 156.2 | 0.6 | 8.7 |
| After Neutralization | 7.42 | 0.504 | 0.513 | 5.3 | 3.8 | 9.8 |
| Plant Discharge (after cooling towers) | 7.43 | 0.530 | 0.527 | 5.9 | 4.0 | 11.7 |
| MgSO$_4$ Stock Solution | 8.66 | 0.465 | 0.684 | 5.4% | 12.4 | 967.0 |

Note:
[1]Units in mg/L except pH and as noted.
[2]All data refers to solutions, no solids.
[3]Plant flowrate 65,000 gpm
[4]The pH and TDS of the clarifier overflow after neutralization were within environmental guidelines.

overflow weir. Plant operating data are provided in the Table 14. From this data it is seen that fluoride ion concentration is reduced from 1.13 mg/L in the raw feed water to 0.504 mg/L in the clarifier overflow, and B concentration is reduced from 0.741 to 0.506.

EXAMPLE 8

Figure 17:
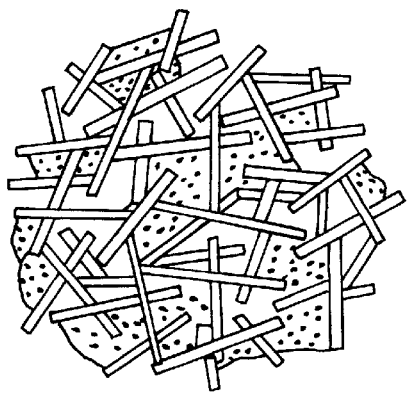
FIG. 17 is a schematic representation of the sludge particles produced by the water treatment process of the invention.
Figure 17:
Figure 17:
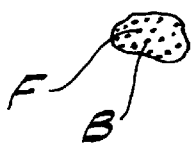

A quantity of sludge generated in full scale operation of the water treatment process of the invention was examined by scanning electron microscope (SEM). From photomicrographs (FIGS. 13 to 16) it is concluded that the precipitate formed by the process is in the nature of spherulitic matter. On the basis of analyses including Time of Flight SIMS (Secondary Ion Mass Spectrometry), Time of Flight LIMS (Laser Ionization Mass Spectrometry), and Electron Probe Analysis, it is concluded that the precipitated crystals have the structure presented schematically in FIG. 17.

As various changes could be made in the above embodiments without departing from the scope of the invention, it is intended that all matter contained in the above description shall be interpreted as illustrative and not in a limiting sense.

What is claimed is:

1. A process for reducing boron content of feed water containing boron, the process comprising adjusting the pH of the feed water with an alkaline hydroxide to at least about 10.2 in the presence of silicon and a source of magnesium in a concentration of between about 10 and about 80 mg magnesium per liter of feed water, to produce treated water and a magnesium precipitate containing boron and separating the precipitate from said treated water such that the treated water contains less than about 2 mg/L boron, wherein the magnesium precipitate comprises 3MgO.Mg(OH)$_2$.6SiO$_2$.6H$_2$O (sepiolite), and Mg (OH)$_2$ (magnesium hydroxide).

2. The process of claim 1 wherein said source of magnesium is selected from magnesium present in the feed water, magnesium added to the feed water in the form of a magnesium salt, and combinations thereof.

3. The process of claim 2 wherein the pH is adjusted to between about 10.2 and about 10.6.

4. The process of claim 1 wherein the boron content of the feed water is in the range of about 0.8 mg/L to about 5 mg/L and the boron content of the treated water is less than about 0.7 mg/L.

5. The process of claim 1 wherein said feed water contains at least about 1.3 mg/L fluoride ions and said treated water contains less than about 0.9 mg/L fluoride ions.

6. A process for reducing fluoride ion of feed water containing fluoride ion, the process comprising adjusting the pH of the feed water with an alkaline hydroxide to at least about 10.2 in the presence of silicon and a source of magnesium in a concentration of between about 10 and about 80 mg magnesium per liter of feed water, to produce treated water and a magnesium precipitate containing fluorine and separating the precipitate from said treated water such that the treated water contains loss than about 0.9 mg/L fluoride ions, wherein the magnesium precipitate comprises 3MgO.Mg(OH)$_2$.6SiO$_2$.6H$_2$O (sepiolite), and Mg(OH)$_2$ (magnesium hydroxide).

7. The process of claim 6 wherein said source of magnesium is selected from magnesium present in the feed water, magnesium added to the feed water in the form of a magnesium salt, and combinations thereof.

8. The process of claim 7 wherein the pH is adjusted to between about 10.2 and about 10.6.

9. A process for reducing boron content of water, the process comprising contacting feed water containing boron in the presence of a source of magnesium and a source of silicon with an alkaline hydroxide to adjust the pH of the feedwater to at least about 10.2 to produce treated waler and a magnesium precipitate comprising an alkaline magnesium silicate and boron and separating the precipitate from said treated water such that the treated water has a reduced boron content, wherein the magnesium precipitate is 3MgO.Mg(OH)$_2$.6SiO$_2$.6H$_2$O (sepiolite), and Mq (OH)$_2$ (magnesium hydroxide).

10. The process of claim 9 wherein the boron content of the treated water is less than about 75% of the boron content of the feed water.

11. The process of claim 9 wherein the temperature of the feed water is in the range of about 85° F. to about 130° F. and contacting with alkaline hydroxide is controlled to raise the pH of the feed water to between about 10.2 and about 10.6.

12. The process of claim 9 wherein said feed water contains fluoride ions, wherein said magnesium precipitate contains fluorine, and wherein said treated water has a reduced fluoride ion content.

13. The process of claim 12 in which the fluoride ion content of the treated water is less than about 75% of the fluoride ion content of the feed water.

14. The process of claim 13 wherein the temperature of the feed water is in the range of about 85° F. to about 130° F. and contacting with alkaline hydroxide is controlled to raise the pH of the feed water to between about 10.2 and about 10.6.

15. A process for reducing fluoride ion content of water, the process comprising contacting feed water containing fluoride ion in the presence of a source of magnesium and a source of silicon with an alkaline hydroxide to adjust the pH of the feedwater to at least about 10.2 to produce treated water and a magnesium precipitate comprising an alkaline magnesium silicate and fluorine and separating the precipitate from said treated water such that the treated water has a reduced fluoride ion content, wherein the magnesium precipitate comprises $3MgO \cdot Mg(OH)_2 \cdot 6SiO_2 \cdot 6H_2O$ (sepiolite) and $Mg(OH)_2$ (magnesium hydroxide).

16. The process of claim 15 wherein the temperature of the feed water is in the range of about 85° F. to about 130° F. and contacting with alkaline hydroxide is controlled to raise the pH of the feed water to between about 10.2 and about 10.6.

17. The process of claim 15 wherein the fluoride ion content of the treated water is less than about 75% of the fluoride ion content of the feed water.

18. A process for reducing boron content of water, the process comprising contacting feed water at a temperature in the range of about 85° F. to about 130° F. containing boron in the presence of silicon and a source of magnesium with an alkaline hydroxide to adjust the pH of the feed water to between about 10.2 and about 10.6 to produce treated water and a magnesium precipitate containing boron, and separating the precipitate from said treated water to produce treated water having a reduced boron content, wherein the magnesium precipitate comprises $3MgO \cdot Mg(OH)_2 \cdot 6SiO_2 \cdot 6H_2O$ (sepiolite), and $Mg(OH)_2$ (magnesium hydroxide).

19. The process of claim 18 wherein the boron content of the treated water is less than about 75% of the boron content of the feed water.

20. The process of claim 18 wherein said feed water contains fluoride ions, wherein said magnesium precipitate contains fluorine, and wherein said treated water has a reduced fluoride ion content.

21. The process of claim 20 wherein the fluoride ion content of the treated water is less than about 75% of the fluoride ion content of the feed water.

22. A process for reducing fluoride ion content of water, the process comprising contacting feed water at a temperature in the range of about 85° F. to about 130° F. containing fluoride ion in the presence of silicon and a source of magnesium in a concentration of between about 10 and about 80 mg magnesium per liter of feed water with an alkaline hydroxide to adjust the pH of the feed water to between about 10.2 and about 10.6 to produce treated water and a magnesium precipitate containing fluorine, and separating the precipitate from said treated water to produce treated water having a reduced fluoride ion content, wherein the magnesium precipitate is $3MgO \cdot Mg(OH_2 \cdot 6SiO_2 \cdot 6H_2O$ (sepiolite), and $Mg(OH)_2$ (magnesium hydroxide).

23. The process of claim 22 wherein the fluoride ion content of the treated water is less than about 75% of the fluoride ion content of the feed water.

24. A process for reducing boron content of water, the process comprising:

contacting feed water containing boron in the presence of silicon and a source of magnesium with an alkaline hydroxide in a contacting zone to adjust the pH of the feed water to at least about 10.2 to produce treated water and a magnesium precipitate containing boron;

separating the treated water and precipitate into a substantially liquid fraction comprising treated water having a reduced boron content and a substantially solid fraction comprising said precipitate; and transferring a quantity of said solid fraction to the contacting zone to facilitate nucleation of said magnesium precipitate;

wherein the magnesium precipitate comprises $3MgO \cdot Mg(OH)_2 \cdot 6SiO_2 \cdot 6H_2O$ (sepiolite), and $Mg(OH)_2$ (magnesium hydroxide).

25. The process of claim 24 wherein said feed water contains fluoride ions, wherein said magnesium precipitate contains fluorine, and wherein said treated water has a reduced fluoride ion content.

26. A process for reducing fluoride ion content of water, the process comprising:

contacting feed water containing fluoride ion in the presence of silicon and a source of magnesium with an alkaline hydroxide in a contacting zone to adjust the pH of the feed water to at least about 10.2 to produce treated water and a magnesium precipitate containing fluorine;

separating the treated water and precipitate into a substantially liquid fraction comprising treated water having a reduced fluoride ion content and a substantially solid fraction comprising said precipitate; and transferring a quantity of said solid fraction to the contacting zone to facilitate nucleation of said magnesium precipitate;

wherein the magnesium precipitate comprises $3MgO \cdot Mg(OH)_2 \cdot 6SiO_2 \cdot 6H_2O$ (sepiolite), and $Mg(OH)_2$ (magnesium hydroxide).

\* \* \* \* \*